US012229805B2

(12) United States Patent
Martínez Cebrián et al.

(10) Patent No.: US 12,229,805 B2
(45) Date of Patent: Feb. 18, 2025

(54) METHODS, SYSTEMS, ARTICLES OF MANUFACTURE, AND APPARATUS FOR PROCESSING AN IMAGE USING VISUAL AND TEXTUAL INFORMATION

(71) Applicant: Nielsen Consumer LLC, New York, NY (US)

(72) Inventors: Javier Martínez Cebrián, Madrid (ES); Roberto Arroyo, Madrid (ES); David Jiménez, Guadalajara (ES)

(73) Assignee: Nielsen Consumer LLC, Chicago, IL (US)

( * ) Notice: Subject to any disclaimer, the term of this patent is extended or adjusted under 35 U.S.C. 154(b) by 269 days.

(21) Appl. No.: 17/566,135

(22) Filed: Dec. 30, 2021

(65) Prior Publication Data
US 2023/0214899 A1    Jul. 6, 2023

(51) Int. Cl.
*G06Q 30/00*        (2023.01)
*G06Q 30/0241*      (2023.01)
(Continued)

(52) U.S. Cl.
CPC .......... *G06Q 30/0276* (2013.01); *G06T 7/33* (2017.01); *G06V 10/70* (2022.01); *G06V 30/10* (2022.01); *G06T 2207/20081* (2013.01)

(58) Field of Classification Search
CPC .......... G06Q 30/0276; G06T 7/33; G06T 2207/20081; G06V 10/70; G06V 30/10; G06F 16/5846
See application file for complete search history.

(56) References Cited

U.S. PATENT DOCUMENTS 3,323,135 A    6/1967  Miller
5,410,611 A    4/1995  Huttenlocher et al.
(Continued)

FOREIGN PATENT DOCUMENTS

CA    2957433 C  *  6/2020  ............ G06F 16/51
CN    103123685      5/2013
(Continued)

OTHER PUBLICATIONS

Arroyo et al., Multi-label classification of promotions in digital leaflets using textual and visual information, arXiv:2010.03331v1 (Year: Oct. 7, 2020).*

(Continued)

*Primary Examiner* — Ping Y Hsieh
*Assistant Examiner* — Xiao Liu
(74) *Attorney, Agent, or Firm* — HANLEY, FLIGHT & ZIMMERMAN, LLC

(57) ABSTRACT

Methods, apparatus, systems, and articles of manufacture are disclosed for processing an image using visual and textual information. An example apparatus includes at least one memory, instructions in the apparatus, and processor circuitry to execute the instructions to detect regions of interest corresponding to a product promotion of an input digital leaflet, extract textual features from the product promotion by applying an optical character recognition (OCR) algorithm to the product promotion and associating output text data with corresponding ones of the regions of interest, determine a search attribute corresponding to the product promotion, generate a first dataset of candidate products corresponding to the product in the product promotion by comparing the search attribute against a second dataset of products, and select a product from the first dataset of candidate products to associate with the product (Continued)

promotion, the product selected based on a match determination.

20 Claims, 13 Drawing Sheets

(51) Int. Cl.
  *G06T 7/33* (2017.01)
  *G06V 10/70* (2022.01)
  *G06V 30/10* (2022.01)

(56) References Cited

U.S. PATENT DOCUMENTS

| | | |
|---|---|---|
| 5,606,690 A | 2/1997 | Hunter et al. |
| 7,454,063 B1 | 11/2008 | Kneisl et al. |
| 7,792,709 B1 | 9/2010 | Trandal et al. |
| 8,285,047 B2 | 10/2012 | Nagarajan et al. |
| 8,494,281 B2 | 7/2013 | Nagarajan |
| 8,787,695 B2 | 7/2014 | Wu et al. |
| 8,792,141 B2 | 7/2014 | Moore et al. |
| 8,983,170 B2 | 3/2015 | Nepomniachtchi et al. |
| 9,014,432 B2 | 4/2015 | Fan et al. |
| 9,158,744 B2 | 10/2015 | Rao et al. |
| 9,239,952 B2 | 1/2016 | Hsu et al. |
| 9,262,686 B1 | 2/2016 | Singer |
| 9,290,022 B2 | 3/2016 | Makabe |
| 9,298,685 B2 | 3/2016 | Barrus |
| 9,298,979 B2 | 3/2016 | Nepomniachtchi et al. |
| 9,323,135 B1 | 4/2016 | Veloso |
| 9,324,073 B2 | 4/2016 | Nepomniachtchi et al. |
| 9,384,389 B1 | 7/2016 | Sankaranarayanan et al. |
| 9,384,839 B2 | 7/2016 | Avila |
| 9,396,540 B1 | 7/2016 | Sampson |
| 9,684,842 B2 | 6/2017 | Deng |
| 9,710,702 B2 | 7/2017 | Nepomniachtchi et al. |
| 9,747,504 B2 | 8/2017 | Ma et al. |
| 9,760,786 B2 | 9/2017 | Sahagun |
| 9,824,270 B1 | 11/2017 | Mao |
| 9,875,385 B1 | 1/2018 | Humphreys |
| 10,026,061 B2 | 7/2018 | Cheek |
| 10,032,072 B1 | 7/2018 | Tran et al. |
| 10,157,425 B2 | 12/2018 | Chelst et al. |
| 10,235,585 B2 | 3/2019 | Deng |
| 10,242,285 B2 | 3/2019 | Thrasher et al. |
| 10,395,772 B1 | 8/2019 | Lucas |
| 10,679,283 B1 | 6/2020 | Pesce |
| 11,257,049 B1 | 2/2022 | Durazo Almeida |
| 11,321,956 B1 | 5/2022 | Geng |
| 11,410,446 B2 | 8/2022 | Shanmuganathan |
| 11,414,053 B2 | 8/2022 | Tanaami et al. |
| 11,468,491 B2 | 10/2022 | Dalal |
| 11,476,981 B2 | 10/2022 | Wei et al. |
| 11,562,557 B2 | 1/2023 | Miginnis et al. |
| 11,587,148 B2 | 2/2023 | Elder |
| 11,593,552 B2 | 2/2023 | Sarkar |
| 11,609,956 B2 | 3/2023 | Jain |
| 11,625,930 B2 | 4/2023 | Rodriguez |
| 11,810,383 B2 | 11/2023 | Patel et al. |
| 11,842,035 B2 | 12/2023 | Jahjah et al. |
| 2002/0037097 A1 | 3/2002 | Hoyos et al. |
| 2003/0185448 A1 | 10/2003 | Seeger |
| 2006/0232619 A1 | 10/2006 | Otsuka et al. |
| 2007/0041642 A1 | 2/2007 | Romanoff et al. |
| 2008/0205759 A1 | 8/2008 | Zandifar et al. |
| 2009/0164422 A1 | 6/2009 | Pacella |
| 2010/0306080 A1 | 12/2010 | Trandal et al. |
| 2011/0122443 A1 | 5/2011 | Otsuka et al. |
| 2011/0243445 A1 | 10/2011 | Uzelac |
| 2011/0289395 A1 | 11/2011 | Breuel et al. |
| 2011/0311145 A1 | 12/2011 | Bern et al. |
| 2012/0183211 A1 | 7/2012 | Hsu et al. |
| 2012/0274953 A1 | 11/2012 | Makabe |
| 2012/0330971 A1 | 12/2012 | Thomas et al. |
| 2013/0058575 A1 | 3/2013 | Koo et al. |
| 2013/0170741 A9 | 7/2013 | Hsu et al. |
| 2014/0002868 A1 | 1/2014 | Landa |
| 2014/0064618 A1 | 3/2014 | Janssen, Jr. |
| 2014/0188647 A1 | 7/2014 | Argue |
| 2014/0195891 A1 | 7/2014 | Venkata Radha Krishna Rao et al. |
| 2015/0039479 A1 | 2/2015 | Gotanda |
| 2015/0127428 A1 | 5/2015 | Gharachorloo |
| 2015/0169951 A1 | 6/2015 | Khintsitskiy et al. |
| 2015/0254778 A1 | 9/2015 | Kmak |
| 2015/0317642 A1 | 11/2015 | Argue |
| 2015/0363792 A1 | 12/2015 | Arini |
| 2015/0363822 A1 | 12/2015 | Rowe |
| 2016/0005189 A1 | 1/2016 | Gray |
| 2016/0034863 A1 | 2/2016 | Ross |
| 2016/0063469 A1 | 3/2016 | Etzion |
| 2016/0125383 A1 | 5/2016 | Chan et al. |
| 2016/0171585 A1 | 6/2016 | Singh |
| 2016/0203625 A1 | 7/2016 | Khan |
| 2016/0210507 A1 | 7/2016 | Abdollahian |
| 2016/0234431 A1 | 8/2016 | Kraft |
| 2016/0307059 A1 | 10/2016 | Chaudhury |
| 2016/0342863 A1 | 11/2016 | Kwon et al. |
| 2017/0293819 A1 | 10/2017 | Deng |
| 2018/0005345 A1 | 1/2018 | Apodaca |
| 2018/0053045 A1 | 2/2018 | Lorenzini |
| 2018/0060302 A1 | 3/2018 | Liang et al. |
| 2018/0317116 A1 | 11/2018 | Komissarov et al. |
| 2018/0336509 A1 | 11/2018 | Guttmann |
| 2019/0026803 A1* | 1/2019 | De Guzman ...... G06Q 30/0641 |
| 2019/0050639 A1 | 2/2019 | Ast |
| 2019/0080207 A1 | 3/2019 | Chang |
| 2019/0171900 A1 | 6/2019 | Thrasher |
| 2019/0244020 A1 | 8/2019 | Yoshino |
| 2019/0272360 A1 | 9/2019 | Kursun |
| 2019/0325211 A1 | 10/2019 | Ordonez et al. |
| 2019/0332662 A1 | 10/2019 | Middendorf et al. |
| 2019/0354818 A1 | 11/2019 | Reisswig |
| 2020/0097718 A1 | 3/2020 | Schafer |
| 2020/0142856 A1 | 5/2020 | Neelamana |
| 2020/0151444 A1 | 5/2020 | Price et al. |
| 2020/0151902 A1* | 5/2020 | Almazán ................ G06T 7/77 |
| 2020/0175267 A1 | 6/2020 | Schafer et al. |
| 2020/0249803 A1 | 8/2020 | Sobel |
| 2020/0364451 A1 | 11/2020 | Ammar et al. |
| 2020/0401798 A1 | 12/2020 | Foncubierta Rodriguez |
| 2020/0410231 A1 | 12/2020 | Chua |
| 2021/0004880 A1 | 1/2021 | Benkreira et al. |
| 2021/0019287 A1 | 1/2021 | Prasad |
| 2021/0034856 A1 | 2/2021 | Torres |
| 2021/0090694 A1 | 3/2021 | Colley |
| 2021/0117665 A1 | 4/2021 | Simantov |
| 2021/0117668 A1 | 4/2021 | Zhong |
| 2021/0142092 A1 | 5/2021 | Zhao et al. |
| 2021/0149926 A1 | 5/2021 | Komninos |
| 2021/0158038 A1 | 5/2021 | Shanmuganathan et al. |
| 2021/0216765 A1 | 7/2021 | Xu |
| 2021/0248420 A1 | 8/2021 | Zhong |
| 2021/0295101 A1 | 9/2021 | Tang |
| 2021/0319217 A1 | 10/2021 | Wang |
| 2021/0334737 A1 | 10/2021 | Balaji |
| 2021/0343030 A1 | 11/2021 | Sagonas |
| 2021/0357710 A1 | 11/2021 | Zhang |
| 2021/0406533 A1 | 12/2021 | Arroyo et al. |
| 2022/0004756 A1 | 1/2022 | Jennings |
| 2022/0114821 A1 | 4/2022 | Arroyo et al. |
| 2022/0180113 A1 | 6/2022 | Patel |
| 2022/0189190 A1 | 6/2022 | Arroyo et al. |
| 2022/0198185 A1 | 6/2022 | Prebble |
| 2022/0350946 A1 | 11/2022 | Hjerrild |
| 2022/0383651 A1 | 12/2022 | Shanmuganathan |
| 2022/0397809 A1 | 12/2022 | Talpade |
| 2022/0414630 A1 | 12/2022 | Yebes Torres |
| 2023/0004748 A1 | 1/2023 | Rodriguez |
| 2023/0005286 A1 | 1/2023 | Yebes Torres |
| 2023/0008198 A1 | 1/2023 | Gadde |
| 2023/0057687 A1 | 2/2023 | Mantri |
| 2023/0196806 A1 | 6/2023 | Ramalingam |
| 2023/0214899 A1 | 7/2023 | Martínez Cebrián et al. |

(56) References Cited

U.S. PATENT DOCUMENTS

| | | |
|---|---|---|
| 2023/0230408 A1 | 7/2023 | Arroyo et al. |
| 2023/0394859 A1 | 12/2023 | Montero et al. |
| 2024/0013562 A1 | 1/2024 | Montero |

FOREIGN PATENT DOCUMENTS

| | | |
|---|---|---|
| CN | 104866849 | 8/2015 |
| CN | 108229397 | 6/2018 |
| CN | 108829397 A | 11/2018 |
| CN | 109389124 | 2/2019 |
| CN | 112446351 | 3/2021 |
| CN | 112560862 | 3/2021 |
| DE | 202013005144 | 10/2013 |
| GB | 108829397 | 1/2020 |
| GB | 2595412 A | 11/2021 |
| JP | H0749529 | 2/1995 |
| JP | 2008021850 A | 1/2008 |
| JP | 200821850 | 5/2008 |
| JP | 2008210850 A | 9/2008 |
| JP | 2008211850 A | 9/2008 |
| JP | 2019139737 | 8/2019 |
| JP | 7049529 | 4/2022 |
| KR | 101831204 | 2/2018 |
| WO | 2013044145 | 3/2013 |
| WO | 2018054326 A1 | 3/2018 |
| WO | 2018201423 A1 | 11/2018 |
| WO | 2020194004 | 10/2020 |
| WO | 2022006295 | 1/2022 |
| WO | 2022123199 | 6/2022 |

OTHER PUBLICATIONS

Visich, Bar Codes and Their Applications, RS codes—Proc. of the third (Year: 1999).*

United Kingdom Patent Office, "Examination Report under section 18(3)," issued in connection with GB Application No. 2112299.9, dated Feb. 17, 2023, 2 pages.

United States and Patent and Trademark Office, "Non-Final Office Action," issued in connection with U.S. Appl. No. 17/883,309, dated Jan. 20, 2023, 14 pages.

European Patent Office, "Communication Pursuant to Rule 69 EPC," issued Jan. 23, 2023 in connection with European Patent Application No. 22184405.3, 2 pages.

International Searching Authority, "International Preliminary Report on Patentability," issued in connection with Application No. PCT/US2021/039931, issued Jan. 12, 2023, 6 pages.

United States Patent and Trademark Office, "Final Office Action," issued in connection with U.S. Appl. No. 17/075,675, issued Mar. 7, 2023, 11 pages.

European Patent Office, "Communication pursuant to Rule 69 EPC," issued in connection with Application No. 22180113.7, dated Jan. 10, 2023, 2 pages.

United States Patent and Trademark Office, "Non-Final Office Action," issued in connection with U.S. Appl. No. 17/345,940, issued Mar. 16, 2023, 13 pages.

United States Patent and Trademark Office, "Final Office Action," issued in connection with U.S. Appl. No. 17/379,280, dated May 5, 2023, 17 pages.

Canadian Patent Office, "Office Action," issued in connection with Application No. 3,124,868, dated Nov. 10, 2022, 4 pages.

Huang et al., "Mask R-CNN with Pyramid Attention Network for Scene Text Detection", arXiv:1811.09058v1, pp. 1-9, https://arxiv.org/abs/1811.09058, Nov. 22, 2018, 9 pages.

Feng et al., "Computer vision algorithms and hardware implementations: A survey", Integration: the VLSI Journal, vol. 69, pp. 309-320, https://www.sciencedirect.com/science/article/pii/S0167926019301762, accepted Jul. 27, 2019, 12 pages.

United States Patent and Trademark Office, "Notice of Allowance and Fee(s) Due," issued in connection with U.S. Appl. No. 17/075,675, issued Jun. 26, 2023, 8 pages.

Google, "Detect Text in Images," Mar. 29, 2021, 20 pages. Retrieved from http://cloud.google.com/vision/docs/ocr.

Qasim et al., "Rethinking Table Recognition using Graph Neural Networks," In International Conference on Document Analysis and Recognition (ICDAR), Jul. 3, 2019, 6 pages.

Nshuti, "Mobile Scanner and OCR (A First Step Towards Receipt to Spreadsheet)," 2015, 3 pages.

O'Gorman et al., "Document Image Analysis," IEEE Computer Society Executive Briefings, 2009, 125 pages.

International Searching Authority, "Search Report and Written Opinion," issued in connection with Application No. PCT/US2021/039931, dated Nov. 4, 2021, 7 pages.

Genereux et al., "NLP Challenges in Dealing with OCR-ed Documents of Derogated Quality," Workshop on Replicability and Reproducibility in Natural Language Processing: adaptive methods, resources and software at IJCAI 2015, Jul. 2015, 6 pages.

Govindan et al., "Character Recognition—A Review," Pattern Recognition, vol. 23, No. 7, pp. 671-683, 1990, 13 pages.

Lecun et al., "Deep Learning," Nature, vol. 521, pp. 436-444, May 28, 2015, 9 pages.

Kim et al., "Character-Aware Neural Language Models," Proceedings of the Thirtieth AAAI Conference on Artificial Intelligence (AAAI'16), pp. 2741-2749, 2016, 9 pages.

Wikipedia, "Precision & Recall," Dec. 17, 2018 revision, 8 pages.

Hui, "mAP (mean Average Precision) for Object Detection," Mar. 6, 2018, 2 pages. Retrieved from [https://medium.com/@jonathan_hui/map-mean-average-precision-for-object-detection-45c121a31173] on May 11, 2020, 2 pages.

Artificial Intelligence & Image Analysis, "Historic Document Conversion," Industry Paper, accessed on Jan. 30, 2019, 4 pages.

Artificial Intelligence & Image Analysis, "Intelligent Automation Eliminates Manual Data Entry From Complex Documents," White Paper, accessed on Jan. 30, 2019, 3 pages.

Vogel et al., "Parallel Implementations of Word Alignment Tool," Software Engineering, Testing, and Quality Assurance for Natural Language Processing, pp. 49-57, Jun. 2008, 10 pages.

International Searching Authority, "International Search Report," mailed in connection with International Patent Application No. PCT/US2020/061269, on Mar. 11, 2021, 3 pages.

International Searching Authority, "Written Opinion," mailed in connection with International Patent Application No. PCT/US2020/061269, on Mar. 11, 2021, 4 pages.

United States Patent and Trademark Office, "Non-Final Office Action," issued in connection with U.S. Appl. No. 16/692,797, issued Mar. 16, 2021, 12 pages.

United States Patent and Trademark Office, "Final Office Action," issued in connection with U.S. Appl. No. 16/692,797, issued Oct. 27, 2021, 14 pages.

International Searching Authority, "International Search Report, " mailed in connection with International Patent Application No. PCT/IB2019/000299, on Dec. 23, 2019, 3 pages.

International Searching Authority, "Written Opinion," mailed in connection with International Patent Application No. PCT/IB2019/000299, on Dec. 23, 2019, 4 pages.

Bartz et al., "STN-OCT: A Single Neural Network for Text Detection and Text Recognition," Computer Vision and Pattern Recognition, Jul. 27, 2017, 9 pages.

Ozhiganov, "Deep Dive Into OCR for Receipt Recognition," DZone, Jun. 21, 2017, 18 pages.

Akbik et al., "Contextual String Embeddings for Sequence Labeling," In Proceedings of the 27th International Conference on Computational Linguistics (COLING), 2018, 12 pages.

Bojanowski et al., "Enriching Word Vectors with Subword Information," In Journal Transactions of the Association for Computational Linguistics, 2017, vol. 5, pp. 135-146, 12 pages.

Devlin et al., "BERT: Pre-training of Deep Bidirectional Transformers for Language Understanding," In Conference of the North American Chapter of the Association for Computational Linguistics (NAACL-HLT), Jun. 24, 2019, 16 pages.

DeepDive, "Distant Supervision" 2021, 2 pages. [available online on Stanford University website, http://deepdive.stanford.edu/distant_supervision].

(56) References Cited

OTHER PUBLICATIONS

Joulin et al., "Bag of Tricks for Efficient Text Classification," In Proceedings of the 15th Conference of the European Chapter of the Association for Computational Linguistics, Aug. 9, 2016, 5 pages.
Krizhevsky et al., "ImageNet Classification with Deep Convolutional Neural Networks," In International Conference on Neural Information Processing Systems (NIPS), 2012, 9 pages.
Konda et al., " Magellan: Toward Building Entity Matching Management Systems Over Data Science Stacks," Proceedings of the VLDB Endowment, vol. 9, No. 13, pp. 1581-1584, 2016, 4 pages.
Levenshtein, "Binary Codes Capable of Correcting Deletions, Insertions, and Reversals," Soviet Physics—Doklady, Cybernetics and Control Theory, pp. 707-710, vol. 10, No. 8, Feb. 1966, 4 pages.
Mudgal et al., "Deep learning for entity matching: A design space exploration," In Proceedings of the 2018 International Conference on Management of Data, 2018, Houston, TX, 16 pages.
Redmon et al., "You Only Look Once: Unified, Real-Time Object Detection," In Conference on Computer Vision and Pattern Recognition (CVPR), 2016, 10 pages.
Ren et al., "Faster R-CNN: Towards Real-Time Object Detection with Region Proposal Networks," In International Conference on Neural Information Processing Systems (NIPS), pp. 91-99, 2015, 14 pages.
Smith et al., "Identification of Common Molecular Subsequences," Reprinted Journal of Molecular Biology, Academic Press Inc. (London) Ltd., pp. 195-197, 1981, 4 pages.
Github, "Tesseract OCR" Tesseract Repository on GitHub, 2020, 4 pages. [available online, https://github.com/tesseract-ocr/].
Vaswani et al., "Attention Is All You Need," 31st Conference on Neural Information Processing Systems (NIPS 2017), Long Beach, CA, 2017, 11 pages.
United States Patent and Trademark Office, "Advisory Action," issued in connection with U.S. Appl. No. 16/692,797, dated Feb. 16, 2022, 4 pages.
Oliveira et al., "dhSegment: A generic deep-learning approach for document segmentation," In 16th International Conference on Frontiers in Handwriting Recognition (ICFHR), 2019, 6 pages.
Ronneberger et al., "U-Net: Convolutional Networks for Biomedical Image Segmentation," Medical Image Computing and Computer-Assisted Intervention (MICCAI), 2015, 8 pages.
Lowe, "Distinctive Image Features from Scale-Invariant Keypoints," International Journal of Computer Vision (IJCV), Jan. 5, 2004, 28 pages.
Marinai, "Introduction to Document Analysis and Recognition," Machine Learning in Document Analysis and Recognition, 2008, 22 pages.
Zhong et al., "PubLayNet: largest dataset ever for document layout analysis," In International Conference on Document Analysis and Recognition (ICDAR), 2019, 8 pages.
Follmann et al., "MVTec D2S: Densely Segmented Supermarket Dataset". In European Conference on Computer Vision (ECCV), 2018, 17 pages.
Osindero et al., "Recursive Recurrent Nets with Attention Modeling for OCR in the Wild," in Conference on Computer Vision and Pattern Recognition (CVPR), 2016, 10 pages.
NielsenIQ Brandbank, "Nielsen Brandbank Product Library," Online Available. Retrieved on Apr. 1, 2022, 5 pages. [retrieved from: https://www.brandbank.com/us/product-library/].
Ray et al., "U-PC: Unsupervised Planogram Compliance," in European Conference on Computer Vision (ECCV), 2018, 15 pages. [retrieved from: http://openaccess.thecvf.com/content_ECCV_2018/papers/Archan_Ray_U-PC_Unsupervised_Planogram_ECCV_2018_paper.pdf].
Appalaraju et al., "DocFormer: End-to-End Transformer for Document Understanding," arXiv (CoRR), 2021, 22 pages. [retrieved from: https://arxiv.org/pdf/2106.11539.pdf].
Hong et al., "BROS: A Pre-trained Language Model Focusing on Text and Layout for Better Key Information Extraction from Documents," arXiv (CoRR), 2021, 13 pages. [retrieved from: https://arxiv.org/pdf/2108.04539.pdf].
Hwang et al., "Spatial Dependency Parsing for Semi-Structured Document Information Extraction," in International Joint Conference on Natural Language Processing (IJCNLP), 2021, 14 pages. [retrieved from: https://arxiv.org/pdf/2005.00642.pdf].
Shen et al., "LayoutParser: A Unified Toolkit for Deep Learning Based Document Image Analysis," in International Conference on Document Analysis and Recognition (ICDAR), 2021, 16 pages. [retrieved from: https://arxiv.org/pdf/2103.15348.pdf].
Wick et al., "Calamari—A High-Performance Tensorflow-based Deep Learning Package for Optical Character Recognition," Digital Humanities Quarterly, 2020, 12 pages. [retrieved from: https://arxiv.org/ftp/arxiv/papers/1807/1807.02004.pdf].
Yu et al., "PICK: Processing Key Information Extraction from Documents using Improved Graph Learning-Convolutional Networks," in International Conference on Pattern Recognition (ICPR), 2020, 8 pages. [retrieved from: https://arxiv.org/pdf/2004.07464.pdf].
Zacharias et al., "Image Processing Based Scene-Text Detection and Recognition with Tesseract," arXiv (CoRR), 2020, 6 pages. [retrieved from: https://arxiv.org/pdf/2004.08079.pdf].
International Searching Authority, "International Preliminary Report on Patentability" mailed in connection with International Patent Application No. PCT/IB2019/000299, on Sep. 28, 2021, 5 pages.
Github, "Doccano tool," Github.com, downloaded on Apr. 1, 2022, 12 pages. [retrieved from: https://github.com/doccano/doccano].
Github, "FIAT tool—Fast Image Data Annotation Tool, " Github.com, downloaded on Apr. 1, 2022, 30 pages. [retrieved from: https://github.com/christopher5106/FastAnnotationTool].
Datasetlist, "Annotation tools for building datasets," Labeling tools—List of labeling tools, Datasetlist.com, updated Dec. 2021, downloaded on Apr. 1, 2022, 12 pages. [retrieved from: https://www.datasetlist.com/tools/].
Xu et al., "LayoutLM: Pre-training of Text and Layout for Document Image Understanding," in International Conference on Knowledge Discovery & Data Mining (SIGKDD), 2020, 9 pages. [retrieved from: https://arxiv.org/pdf/1912.13318.pdf].
United States Patent and Trademark Office, "Notice of Allowance and Fee(s) Due," issued in connection with U.S. Appl. No. 16/692,797, issued Apr. 5, 2022, 10 pages.
United States Patent and Trademark Office, "Corrected Notice of Allowability," issued in connection with U.S. Appl. No. 16/692,797, issued Apr. 22, 2022, 3 pages.
International Searching Authority, "International Preliminary Report on Patentability," mailed in connection with International Patent Application No. PCT/US2020/061269, on May 17, 2022, 5 pages.
European Patent Office, "Communication pursuant to Rules 161(2) and 162 EPC," issued in connection with Application No. 20891012.5, dated Jun. 29, 2022, 3 pages.
United States Patent and Trademark Office, "Non-Final Action" issued in U.S. Appl. No. 17/075,675, on Sep. 22, 2022, 12 pages.
Huang et al., "LayoutLMv3: Pre-training for Document AI with Unified Text and Image Masking," 30th ACM International Conference on Multimedia, Jul. 2022, 10 pages.
Zhang et al., "Multimodal Pre-training Based on Graph Attention Network for Document Understanding." IEEE Transactions on Multimedia, vol. 25, Oct. 2022, 13 pages.
European Patent Office, "Extended European Search Report," issued in connection with European Patent Application No. 19921870, completed Oct. 3, 2022, 2 pages.
International Searching Authority, "International Search Report," issued in connection with International Patent Application No. PCT/US2022/034570, mailed on Oct. 20, 2022, 3 pages.
International Searching Authority, "Written Opinion," issued in connection with International Patent Application No. PCT/US2022/034570, mailed on Oct. 20, 2022, 5 pages.
Kim et al., "OCR-free Document Understanding Transformer," European Conference on Computer Vision, Oct. 2022, 29 pages.
European Patent Office, "Communication pursuant to Rules 70(2) and 70a(2) EPC," issued in connection with Application No. 19921870.2, dated Nov. 2, 2022, 1 page.
United States Patent and Trademark Office, "Notice of Allowance and Fee(s) Due," issued in connection with U.S. Appl. No. 17/364,419, dated Nov. 4, 2022, 10 pages.

(56) References Cited

OTHER PUBLICATIONS

Canadian Patent Office, "Examiner's Report," issued in connection with Canadian Patent Application No. 3,124,868, mailed on Nov. 10, 2022, 4 pages.
United States Patent and Trademark Office, "Corrected Notice of Allowability", issued in connection with U.S. Appl. No. 17/364,419, dated Nov. 15, 2022, 2 pages.
Zhong et al., "Hierarchical Message-Passing Graph Neural Networks," Data Mining and Knowledge Discovery, Nov. 17, 2022, 29 pages.
European Patent Office, "Extended Search Report," in connection with European Patent Application No. 22180113.7, completed Nov. 14, 2022, 2 pages.
European Patent Office, "European Search Report," issued in connection with European Patent Application No. 22180113.7, Nov. 22, 2022, 25 pages.
Dwivedi et al., "Benchmarking Graph Neural Networks," Journal of Machine Learning Research, Dec. 2022, 49 pages.
United States Patent and Trademark Office, "Non-Final Office Action", issued in connection with U.S. Appl. No. 17/379,280, dated Dec. 2, 2022, 14 pages.
European Patent Office, "Extended European Search Report," issued in connection with European Patent Application No. 22184405.3, dated Dec. 2, 2022, 4 pages.
European Patent Office, "European Search Report," issued in connection with Application No. 22184405.3, completed Nov. 23, 2 pages.
United States Patent and Trademark Office, "Corrected Notice of Allowability," issued in connection with U.S. Appl. No. 17/364,419, dated Jan. 4, 2023, 2 pages.
United States Patent and Trademark Office, "Corrected Notice of Allowability", issued in connection with U.S. Appl. No. 17/364,419, filed Feb. 15, 2023, 2 pages.
United States and Patent and Trademark Office, "Notice of Allowance and Fee(s) Due," issued in connection with U.S. Appl. No. 17/883,309, dated May 11, 2023, 9 pages.
European Patent Office, "Extended European Search Report," issued in connection with European Patent Application No. 22214553.4, dated May 17, 2023, 9 pages.
United States and Patent and Trademark Office, "Advisory Action," issued in connection with U.S. Appl. No. 17/075,675, dated May 30, 2023, 3 pages.
International Searching Authority, "International Search Report," issued in connection with International Patent Application No. PCT/US2023/011859, mailed on Jun. 1, 2023, 3 pages.
International Searching Authority, Written Opinion, issued in connection with International Patent Application No. PCT/US2023/011859, mailed on Jun. 1, 2023, 4 pages.
United States Patent and Trademark Office, "Non-Final Office Action," issued in connection with U.S. Appl. No. 18/191,642, dated Feb. 7, 2024, 18 pages.
United States Patent and Trademark Office, "Notice of Allowance and Fee(s) Due," issued in connection with U.S. Appl. No. 17/345,940, mailed on Jul. 7, 2023, 8 pages.
United Kingdom Intellectual Property Office, "Intention to Grant under Section 18(4)," issued in connection with United Kingdom Patent Application No. 2112299.9, dated Jul. 13, 2023, 2 pages.
United States Patent and Trademark Office, "Advisory Action," issued in connection with U.S. Appl. No. 17/379,280, mailed on Jul. 18, 2023, 3 pages.
Gopal et al., "What is Intelligent Document Processing?" Nano Net Technologies, URL:[https://nanonets.com/blog/intelligent-document-processing/], Jul. 19, 2023, 21 pages.
United States Patent and Trademark Office, "Corrected Notice of Allowability," issued in connection with U.S. Appl. No. 17/345,940, dated Jul. 20, 2023, 3 pages.
Canadian Intellectual Property Office, "Examiner's Report," issued in connection with Canadian Patent Application No. 3,124,868, dated Aug. 10, 2023, 5 pages.
United States Patent and Trademark Office, "Corrected Notice of Allowability," issued in connection with U.S. Appl. No. 17/883,309, mailed on Aug. 17, 2023, 2 Pages.
United Kingdom Intellectual Property Office, "Notification of Grant," issued in connection with United Kingdom Patent Application No. 2112299.9, dated Aug. 29, 2023, 2 pages.
Amazon, "Intelligent Document Processing," Amazon Web Services, https://aws.amazon.com/machine-learning/ml-use-cases/document-processing/fintech/, retrieved on Sep. 8, 2023, 6 pages.
United States Patent and Trademark Office, "Corrected Notice of Allowability," issued in connection with U.S. Appl. No. 17/075,675, mailed on Oct. 10, 2023, 2 pages.
United States Patent and Trademark Office, "Non-Final Office Action," issued in connection with U.S. Appl. No. 17/710,538, dated Oct. 26, 2023, 6 Pages.
European Patent Office, "Extended European Search Report," issued in connection with European Patent Application No. 20891012.5, dated Nov. 17, 2023, 12 pages.
European Patent Office, "Communication pursuant to Rules 70(2) and 70a(2) EPC," issued in connection with European Patent Application No. 20891012.5, dated Dec. 5, 2023, 1 page.
United States Patent and Trademark Office, "Non-Final Office Action" issued in connection with U.S. Appl. No. 17/598,792, mailed on Dec. 29, 2023, 17 pages.
International Searching Authority, "International Preliminary Report on Patentability," issued in connection with International Patent Application No. PCT/US2022/034570, issued on Jan. 4, 2024, 7 pages.
Leicester et al., "Using Scanner Technology to Collect Expenditure Data," Fiscal Studies, vol. 30, Issue 3-4, 2009, 29 pages.
European Patent Office, "Communication pursuant to Article 94(3) EPC," issued in connection with European Patent Application No. 19 921 870.2-1207, on Apr. 9, 2024, 7 pages.
United States Patent and Trademark Office, "Non-Final Office Action," issued in connection with U.S. Appl. No. 18/476,978, dated Apr. 18, 2024, 20 pages.
United States Patent and Trademark Office, "Notice of Allowance and Fee(s) Due," issued in connection with U.S. Appl. No. 17/710,538, dated Apr. 19, 2024, 8 pages.
United States Patent and Trademark Office, "Non-Final Office Action," issued in connection with U.S. Appl. No. 17/710,660, on May 28, 2024, 9 pages.
United States Patent and Trademark Office, "Notice of Allowance and Fee(s) Due," issued in connection with U.S. Appl. No. 17/598,792, dated Jun. 17, 2024, 9 pages.
United States Patent and Trademark Office, "Notice of Allowance and Fee(s) Due," issued in connection with U.S. Appl. No. 18/191,642, dated Jun. 17, 2024, 9 pages.
Canadian Intellectual Property Office, "Office Action," issued in connection with Canadian Patent Application No. 3,182,471, dated May 28, 2024, 5 pages.
United States Patent and Trademark Office, "Corrected Notice of Allowability," issued in connection with U.S. Appl. No. 17/598,792, dated Jul. 3, 2024, 2 pages.
United States Patent and Trademark Office, "Final Office Action," issued in connection with U.S. Appl. No. 18/476,978, dated Aug. 14, 2024, 22 pages.
United States Patent and Trademark Office, "Notice of Allowance and Fee(s) Due," issued in connection with U.S. Appl. No. 17/710,538, dated Aug. 14, 2024, 8 pages.
International Searching Authority, "International Preliminary Report on Patentability," issued in connection with International Application No. PCT/US2023/011859, mailed on Aug. 15, 2024, 6 pages.
United States Patent and Trademark Office, "Notice of Allowance and Fee(s) Due," issued in connection with U.S. Appl. No. 17/598,792, dated Aug. 27, 2024, 9 pages.
United States Patent and Trademark Office, "Notice of Allowance and Fee(s) Due," issued in connection with U.S. Appl. No. 18/191,642, dated Aug. 28, 2024, 7 pages.
United States Patent and Trademark Office, "Non-Final Office Action," issued in connection with U.S. Appl. No. 17/710,649, dated Sep. 16, 2024, 12 pages.

(56) References Cited

OTHER PUBLICATIONS

Poulovassilis et al., "A Nested-Graph Model for the Representation and Manipulation of Complex Objects," ACM Transactions on Information Systems, vol. 12, Issue 1, Jan. 2, 1994, 34 pages.
Hochreiter et al., "Long Short-Term Memory," Neural Computation, Dec. 1997, 46 pages.
Ng et al., "On Spectral Clustering: Analysis and an Algorithm," NIPS'01: Proceedings of the 14th International Conference on Neural Information Processing Systems: Natural and Synthetic, Jan. 2001, 8 pages.
Oliveira et al., "A New Method for Text-Line Segmentation for Warped Documents," International Conference Image Analysis and Recognition, Jun. 21, 2010, 11 pages.
Chung et al., "Empirical Evaluation of Gated Recurrent Neural Networks on Sequence Modeling." NIPS 2014 Deep Learning and Representation Workshop, Dec. 2014, 9 pages.
Kipf et al., "Semi-Supervised Classification with Graph Convolutional Networks," 5th International Conference on Learning Representations, Feb. 22, 2017, 14 Pages.
Velickcvic et al., "Graph Attention Networks," 2018 International Conference on Learning Representations, Feb. 4, 2018 12 pages.
Li et al., "Extracting Figures and Captions from Scientific Publications," Short Paper, Conference on Information and Knowledge Management 2018 (CIKM18), CIKM'18, Oct. 22-26, 2018, Torino, Italy, 4 pages.
Elfwing et al. "Sigmoid-Weighted Linear Units for Neural Network Function Approximation in Reinforcement Learning," Neural Networks: Journal of the International Neural Network Society, vol. 107, Nov. 2017, 18 pages.
Loshchilov et al., "Decoupled Weight Decay Regularization," 2019 International Conference on Learning Representations, Published as a conference paper at ICLR 2019, Jan. 4, 2019, 19 pages.
Nathancy, "How do Imake masks to set all of image background, except the text, to white?", stakoverflow.com, https://stackoverflow.com/questions/56465359/how-do-i-make-masks-to-set-all-of-image-background-except-the-text-to-white, Jun. 5, 2019, 5 pages.
Hu et al., "Hierarchical Graph Convolutional Networks for Semi-supervised Node Classification," 2019 International Joint Conference on Artificial Intelligence, Jun. 2019, 8 pages.
Zhong et al., "PubLayNet: largest dataset ever for document layout analysis," In International Conference on Document Analysis and Recognition (ICDAR), dated Aug. 16, 2019, 8 pages.
Jaume et al., "FUNSD: A Dataset for Form Understanding in Noisy Scanned Documents," International Conference on Document Analysis and Recognition (ICDAR), Oct. 2019, 6 pages.
Yadati et al., "HyperGCN: Hypergraph Convolutional Networks for Semi-Supervised Classification," Proceedings of the 33rd International Conference on Neural Information Processing Systems, Jan. 2019, 18 pages.
Carbonell et al., "Named Entity Recognition and Relation Extraction with Graph Neural Networks in Semi Structured Documents," 2020 International Conference on Pattern Recognition (ICPR), Jan. 10, 2021, 6 pages.
Liu et al., "RoBERTa: A Robustly Optimized BERT Pretraining Approach," International Conference on Learning Representations, Jul. 2019, 13 pages.
Dong et al., "HNHN: Hypergraph Networks with Hyperedge Neurons." ArXiv abs/2006.12278, Jun. 22, 2020, 11 pages.
Chen et al., "HGMF: Heterogeneous Graph-Based Fusion for Multimodal Data with Incompleteness," Proceedings of the 26th ACM SIGKDD International Conference on Knowledge Discovery & Data Mining, KDD '20, Aug. 23-27, 2020, Virtual Event, USA, 11 pages.
Wang et al., "DocStruct: A Multimodal Method to Extract Hierarchy Structure in Document for General Form Understanding," 2020 Conference Empirical Methods in Natural Language Processing (EMNLP), Nov. 16-20, 2020, 11 pages.
Zhu et al., "Heterogeneous Mini-Graph Neural Network and Its Application to Fraud Invitation Detection," 2020 IEEE International Conference on Data Mining (ICDM), Nov. 17, 2020, 9 pages.
Bandyopadhyay et al., "Hypergraph Attention Isomorphism Network by Learning Line Graph Expansion," 2020 IEEE International Conference on Big Data, Dec. 10, 2020, 10 pages.
Arroyo et al., "Multi-label classification of promotions in digital leaflets using textual and visual information," Proceedings of the Workshop on Natural Language Processing in E-Commerce (EComNLP), pp. 11-20, Barcelona, Spain (Online), Dec. 12, 2020, 10 pages.
Nguyen Dang et al., "End-to-End Hierarchical Relation Extraction for Generic Form Understanding," International Conference on Pattern Recognition (ICPR), Jun. 2021, 8 pages.
Xu et al., "LayoutXLM: Multimodal Pre-training for Multilingual Visually-rich Document Understanding," arXiv, Sep. 2021, 10 pages.
Ma et al., "Graph Attention Networks with Positional Embeddings," Pacific-Asia Conference on Knowledge Discovery and Data Mining, Oct. 2021, 13 pages.
Chen et al., "TextPolar: irregular scene text detection using polar representation," International Journal on Document Analysis and Recognition (IJDAR), May 7, 2021, 9 pages.
Li et al. "SelfDoc: Self-Supervised Document Representation Learning." 2021 IEEE/CVF Conference on Computer Vision and Pattern Recognition (CVPR), Jun. 2021, 10 pages.
Xu et al., "LayoutLMv2: Multi-modal Pre-training for Visually-rich Document Understanding." ACL, Jan. 2022 13 pages.
Li et al., "StructuralLM: Structural Pre-training for Form Understanding." 59th Annual Meeting of the Association for Computational Linguistics, May 2021, 10 pages.
Huang et al., "UniGNN: a Unified Framework for Graph and Hypergraph Neural Networks." 30th International Joint Conference on Artificial Intelligence (IJCAI), May 2021, 9 pages.
Tang et al., "MatchVIE: Exploiting Match Relevancy between Entities for Visual Information Extraction", Proceedings of the Thirtieth International Joint Conference on Artificial Intelligence (IJCAI-21), pp. 1039-1045, 2021, 7 pages.
Qian et al., "A Region-Based Hypergraph Network for Joint Entity-Relation Extraction," Knowledge-Based Systems. vol. 228, Sep. 2021, 8 pages.
Davis et al., "Visual FUDGE: Form Understanding via Dynamic Graph Editing," International Conference on Document Analysis and Recognition (ICDAR), Jul. 2021, 16 pages.
Powalski et al., "Going Full-TILT Boogie on Document Understanding with Text-Image-Layout Transformer," International Conference on Document Analysis and Recognition, Mar. 2021, 17 pages.
Garncarek et al., "LAMBERT: Layout-Aware Language Modeling for Information Extraction," International Conference on Document Analysis and Recognition (ICDAR), May 2021, 16 pages.
Prabhu et al., "MTL-FoUn: A Multi-Task Learning Approach to Form Understanding," 2021 International Conference on Document Analysis and Recognition (ICDAR), Sep. 5, 2021, 5 pages.
Li et al., "StrucTexT: Structured Text Understanding with Multi-Modal Transformers," ACM International Conference on Multimedia (ACM Multimedia), Nov. 2021, 9 pages.
European Patent Office, "Communication pursuant to Rules 161(2) and 162 EPC," in connection with European Patent Application No. 19921870.2, issued Nov. 5, 2021, 3 pages.
Zhang et al., "Entity Relation Extraction as Dependency Parsing in Visually Rich Documents," Empirical Methods in Natural Language Processing (EMNLP), Nov. 7-11, 2021, 10 pages.
Hwang et al., "Cost-Effective End-to-end Information Extraction for Semi-structured Document Images," Empirical Methods in Natural Language Processing (EMNLP), Aug. 2021, 9 pages.
Gu et al., "UniDoc: Unified Pretraining Framework for Document Understanding," 35th Conference on Neural Information Processing Systems (NeurIPS 2021), Dec. 6, 2021, 12 pages.
Park et al. "CORD: A Consolidated Receipt Dataset for Post-OCR Parsing. In Workshop on Document Intelligence," 33rd Conference on Neural Information Processing Systems (NeurIPS 2019), Vancouver, Canada, 4 pages.

(56) References Cited

OTHER PUBLICATIONS

Wang et al., "LiLT: A Simple Yet Effective Language-Independent Layout Transformer for Structured Document Understanding," Annual Meeting of the Association for Computational Linguistics (ACL), Feb. 2022, 11 pages.

Gu et al, "XYLayoutLM: Towards Layout-Aware Multimodal Networks For Visually-Rich Document Understanding", in Conference on Computer Vision and Pattern Recognition ( CVPR), 2022, 10 pages.

Villota et al., "Text Classification Models for Form Entity Linking," International Symposium on Distributed Computing and Artificial Intelligence, Dec. 2021 10 pages.

Datasetlist, "A tool using OpenCV to annotate images for image classification, optical character reading, . . . ," Datasetlist.com, dated Jul. 13, 2022, 30 pages.

United States Patent and Trademark Office, "Non-Final Office Action," issued in connection with U.S. Appl. No. 17/345,940, dated Aug. 18, 2022, 8 pages.

Crandall et al., "Extraction of special effects caption text events from digital video," IJDAR, Department of Computer Science and Engineering, The Pennsylvania State University, 202 Pond Laboratory, Universirty Park, PA, Accepted Sep. 13, 2022, pp. 138-157, 20 pages.

United States Patent and Trademark Office, Supplemental Notice of Allowability, issued in connection with U.S. Appl. No. 17/710,538, dated Sep. 11, 2024, 3 pages.

United States Patent and Trademark Office, "Second Notice of Allowability," issued in connection with U.S. Appl. No. 18/191,642, dated Sep. 16, 2024, 2 pages.

United States Patent and Trademark Office, "Notice of Allowance and Fee(s) Due," issued in connection with U.S. Appl. No. 17/710,660, dated Sep. 25, 2024, 9 pages.

United States Patent and Trademark Office, "Advisory Action," issued in connection with U.S. Appl. No. 18/476,978, dated Oct. 7, 2024, 3 pages.

United States Patent and Trademark Office, "Corrected Notice of Allowability," issued in connection with U.S. Appl. No. 17/598,792, dated Oct. 10, 2024, 2 pages.

United States Patent and Trademark Office, "Corrected Notice of Allowability," issued in connection with U.S. Appl. No. 17/710,660, dated Oct. 9, 2024, 2 pages.

United States Patent and Trademark Office, "Corrected Notice of Allowability," issued in connection with U.S. Appl. No. 17/598,792, dated Dec. 5, 2024, 2 pages.

United States Patent and Trademark Office, "Notice of Allowance and Fee(s) Due," issued in connection with U.S. Appl. No. 18/476,978, dated Dec. 13, 2024, 11 pages.

United States Patent and Trademark Office, "Notice of Allowance and Fee(s) Due," issued in connection with U.S. Appl. No. 17/822,664, dated Dec. 31, 2024, 7 pages.

United States Patent and Trademark Office, "Notice of Allowance and Fee(s) Due," issued in connection with U.S. Appl. No. 18/148,947, dated Jan. 8, 2025, 12 pages.

\* cited by examiner

METHODS, SYSTEMS, ARTICLES OF MANUFACTURE, AND APPARATUS FOR PROCESSING AN IMAGE USING VISUAL AND TEXTUAL INFORMATION

FIELD OF THE DISCLOSURE

This disclosure relates generally to computer-based image analysis and, more particularly, to methods, systems, articles of manufacture, and apparatus for processing an image using visual and textual information.

BACKGROUND

Artificial intelligence (AI) leverages computers and machines to mimic problem solving and decision making challenges that typically require human intelligence. For example, computer Vision (CV) and Natural Language Processing (NLP) are two powerful AI techniques that may be combined to process an image. Computer vision trains computers and machines to derive meaningful information from digital images while natural language processing allows a computer or machine to understand and respond to text data. In recent years, there has been a trend of combining both AI techniques for use in multi-modal applications thereby creating innovative solutions to business goals.

Figure 1:
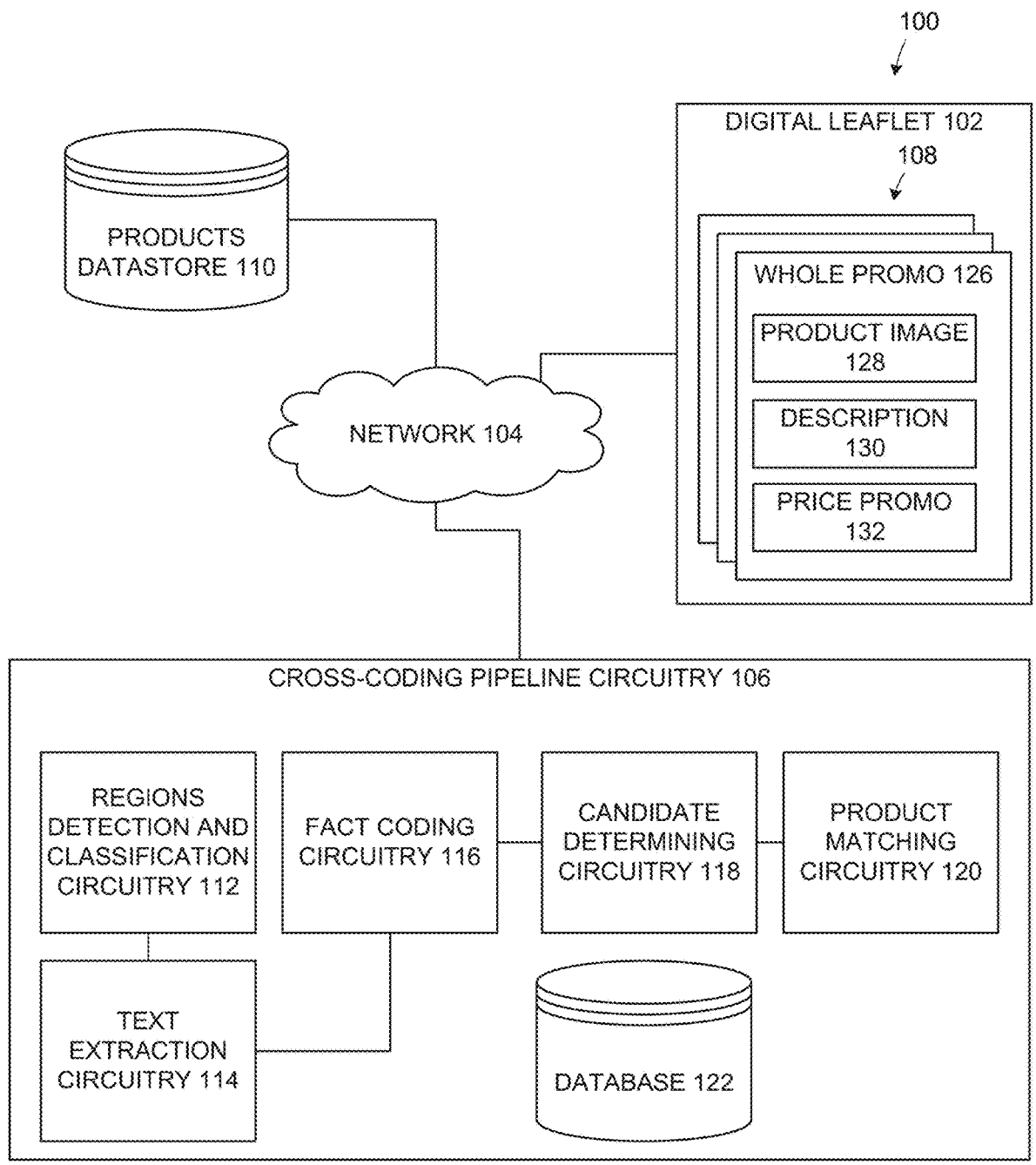
FIG. 1 is a schematic illustration of an example system to implement a leaflet cross-coding pipeline in accordance with the teachings of this disclosure.

The figures are not to scale. In general, the same reference numbers will be used throughout the drawing(s) and accompanying written description to refer to the same or like parts. Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Marketing intelligence companies, such as Nielsen IQ, provide manufacturers and retailers with a complete picture of the complex marketplace and actionable information that brands need to grow their businesses. To do so, marketing intelligence companies apply data analysis techniques to comprehensive data sets to extract insights. For example, applying a causal data analysis to a comprehensive dataset may allow a company to understand causes behind what they observe in their data. Such knowledge can enable the company to accurately assess the impact of their actions when making important business decisions.

Causal data appearing in promotional advertisements can be of great importance for a company. For example, causal data appearing in digital leaflets is valuable to a company because such data can modify the consumption behavior of people's purchases. Accordingly, extracting causal data from digital leaflets is a vital task for marketing intelligence companies such as Nielsen IQ. A digital leaflet as disclosed herein is a digital promotional advertisement having at least one promotion. Typically, a digital leaflet includes a plurality of promotions.

To extract causal data appearing in a digital leaflet, marketing intelligence companies process the digital leaflet and cross-code products appearing in the digital leaflet with another dataset. The task typically involves sourcing digitized leaflets, processing the digital leaflet to cross-code a precise set of products corresponding to promotions in the leaflet, and preparing actionable information to be delivered to customers of the marketing intelligence company. Cross-coding in a digital leaflet includes coding facts about a promotion and matching a product appearing in the promotion with the exact product being promoted. For example, a promotion appearing in a digital leaflet can be cross-coded with a dataset having the product's identifier, such as a universal product code (UPC), an international article number such as a European Article Number (EAN), etc. The EAN is a standardized barcode that is marked on most commercialized products currently available in stores. Accordingly, a product appearing in a digital leaflet can be cross-coded with the products barcode that is stored in a products database.

Processing a digital leaflet for cross-coding is a complex task. For example, processing a leaflet may include, for each promotion in the digital leaflet, predicting a fact for the promotion, assigning search attributes to a product in the promotion, and searching the search attributes against a database of products to determine product's candidate that correspond to the promotion. Further, the process may include ranking the product candidates, selecting the product candidate that corresponds to the promotion appearing in the leaflet, and cross-coding a dataset of products being promotion in the leaflet and the dataset having product's EAN. Consequently, cross-coding in a digital leaflet is resource intensive, time consuming, and often involves human intervention for each promotion appearing in the leaflet. In particular, human involvement has been shown to cause significant problems with processing time due to the vast quantity of leaflets to examine and the vast quantity of candidate product to consider when cross-coding. Additionally, human involvement exhibits erroneous and/or biased results. Any degree of automation applied to the cross-coding process could have a large impact on the productivity and digitalization of marketing intelligence companies. Accordingly, marketing intelligence companies may desire a new process for cross-coding in digital leaflets.

Recent advances in artificial intelligence (AI) enable marketing intelligence companies to solve new and challenging business use cases. A business use case is a specific workflow in a business that produces a desired result. Applying computer vision (CV) and natural language processing (NLP) to cross-coding of digital leaflets improves productivity of marketing intelligence companies and facilitates their digitalization, resulting in more cost effective processes. As noted above, CV and NLP are two powerful AI techniques that may be combined to process an image. Computer vision is a field of AI that trains computers and machines to interpret and understand an image and to act accordingly. Natural language processing is a field of AI concerned with giving computers the ability to understand human language as it is written. In other words, CV and NLP use artificial intelligence to process real world input and make sense of it in a way a computer can understand.

To improve cross-coding in digital leaflets, examples disclosed herein employ a leaflet cross-coding pipeline that utilizes a variety of AI models to efficiently perform tasks that are currently resource intensive and time consuming. Examples disclosed herein utilize CV and NLP techniques to efficiently cross-code an input digital leaflet with a database of products. In doing so, examples disclosed herein improve automation of cross-coding a digital leaflet by processing the digital leaflet via the leaflet cross-coding pipeline. In some examples, a products database includes a set of products and their corresponding EANs. Certain examples include a human-in-the-loop solution to cross-coding in digital leaflets that increases the productivity of the leaflet cross-coding process. Certain examples enable a company to cross-code a larger amount of digital leaflets than would otherwise be feasible.

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In examples disclosed herein, many different types of machine learning models are generated. In some examples disclosed herein, a neural network is used to train a model. A neural network may enable identification of relationships in a data set via a process that mimics how the human brain works. In some examples disclosed herein, a classification model is used. In general, machine learning models/architectures that are suitable to use in the example approaches disclosed herein will be a black box network in which interconnections are not visible outside the model. However, other types of machine learning models could additionally or alternatively be used such as decision trees, support vector machines (SVM), regression analysis, Bayesian models, etc.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.). Alternatively, unsupervised training (e.g., used in deep learning, a subset of machine learning, etc.) involves inferring patterns from inputs to select parameters for the ML/AI model (e.g., without the benefit of expected (e.g., labeled) outputs).

Training is performed using hyperparameters that control how the learning is performed (e.g., a learning rate, a number of layers to be used in the machine learning model, etc.). Training is performed using training data. In some examples disclosed herein, the training data originates from leaflets (e.g., processed by a labeling team). Because supervised training is used in some examples, the training data in such examples is labeled.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

Examples disclosed herein enable a leaflet cross-coding pipeline structured to process a digital leaflet and to cross-code product's appearing in the digital leaflet with another database, such as a products datastore. Examples disclosed herein are applied to a digital leaflet containing at least one promotion. In some examples, a metadata coder generates general information about the digital leaflet prior to and/or while running the digital leaflet though the leaflet cross-coding pipeline. The information may include a retailer associated with the digital leaflet, the retailer's region, a date associated with the digital leaflet, etc. In some examples, the leaflet cross-coding pipeline includes circuitry and models for textual extraction, target attribute determination, product candidate determination, and product selection.

In examples disclosed herein, the leaflet cross-coding pipeline begins by extracting textual features associated with an individual promotion of an input digital leaflet. In some examples, a regional-based AI model is used to detect and classify the regions of interest appearing in a product promotion. In some examples, the AI model is based on a region-based convolutional neural network (R-CNN). However, other neural networks, such as faster R-CNNs, etc. may be used additionally or alternatively. Examples disclosed herein utilize optical character recognition (OCR) to obtain text of interest related to a product being promoted in the digital leaflet (e.g., textual features). For example, an OCR-based algorithm may be applied over the previously detected regions of interest to obtain text of interest appearing in the promotion. Accordingly, examples disclosed herein extract textual features corresponding to a promotion appearing in the digital leaflet.

After textual features of the promotion appearing in the digital leaflet are extracted, the textual features are fed to a subsequent portion of the leaflet cross-coding pipeline to predict attributes corresponding to the promotion. In examples disclosed herein, the extracted textual features are processed using an NLP algorithm to predict target attributes associated with the promotion, such as a fact attribute, a search attribute, etc. In examples disclosed herein, the predicted target attributes include at least one fact attribute and at least one search attribute. In some examples, a target attribute is a category type attribute. In such examples, the NLP algorithm is based on text classification. As disclosed herein, text classification is a machine learning technique that assigns a set of predefined categories to open-ended text. Accordingly, a text classification NLP algorithm may be applied to the extracted textual features to predict a target attribute as a pre-defined category (e.g., fact value, search attribute value, etc.). In some examples, a target attribute is an entity type attribute. In such examples, the NLP algorithm is based on information extraction. As disclosed herein, information extraction is an NLP process for extracting meaningful information from unstructured text data and presenting the information in a structured format. As disclosed herein, an entity is a distinct characteristic. An entity can be defined using its attributes.

In some examples, the leaflet cross coding pipeline includes applying an NLP algorithm to the textual features to determine (e.g., identify) a fact attribute to be coded. The fact attribute is information or data about the promotion itself, such as promotion type, a reduction type, price and promotion, discount, etc. In some examples, the fact attribute is a fact value obtained using a text classification NLP algorithm. In such examples, the fact attribute is a category, such a promotion type category. In some examples, the fact attribute is an entity obtained using an information extraction NLP algorithm. In such examples, the fact attribute is an entity that describes the promotion.

In some examples, the leaflet cross-coding pipeline includes applying an NLP algorithm to the textual features to determine (e.g., identify) search attributes corresponding to a product in the promotion. The search attribute corresponds to information about a product being promoted in the promotion. The search attribute includes information specific to a product appearing in the promotion. In some examples, the search attribute is a search value obtained using a text classification NLP algorithm. For example, a search attribute category may be product category, brand, product class, etc. In some examples, the search attribute is an entity obtained using an information extraction NLP algorithm.

After target attributes are predicted based on the extracted textual features, the leaflet cross-coding pipeline applies disclosed example techniques to determine a candidate product. In examples disclosed herein, the predicted search attribute is searched against a products database to generate product candidates corresponding to a product appearing in a digital leaflet promotion. In some examples, a tuple is generated for each product candidate.

After determining the product candidates, the leaflet cross-coding pipeline applies disclosed example techniques to determine an exact product corresponding to the product appearing in the digital leaflet. Accordingly, examples disclosed herein apply product matching to rank the product candidates and to select a product candidate as appearing in the promotion. In some examples, a product candidate is selected from a ranked list of the product candidates. In some examples, the selected product candidate can then be cross-coded against the database of products.

Examples disclosed herein present a novel pipeline for cross-coding a digital leaflet using a combination of image and text algorithms. Examples disclosed herein are geared towards digital leaflets from the United States of America (e.g., U.S.). However, each country has its own search attributes and facts to code. Examples disclosed herein can be customized based on differences in advertising between countries. For example, general functionalities of the disclosed system can be adapted to a specific country's particularities.

While examples disclosed herein are described in relation to processing and cross-coding a digital leaflet, examples disclosed herein can be applied to other business use cases additionally or alternatively. For example, the novel cross-coding pipeline disclosed herein can be applied to document decoding, item coding, advance purchase coding, etc. For example, the disclosed cross-coding pipeline can be applied to invoice images to perform entity linking. That is, the novel cross-coding pipeline can be used to extract textual features of an input invoice, extract product attributes such a units, price, volume etc., and link the attributes to another dataset. Additionally or alternatively, the novel cross-coding pipeline disclosed herein can be applied to a product packaging image to extract textual features and predict product attributes such as ingredients, nutritional facts, pack size, etc. and to cross-code the product attributes with another dataset.

FIG. 1 illustrates an example environment 100 for processing a digital leaflet using a novel leaflet cross-coding pipeline structured in accordance with the teachings of this disclosure. FIG. 1 includes an example digital leaflet 102, an example network 104, and example cross-coding pipeline circuitry 106. The example digital leaflet 102 of FIG. 1 includes an example promotion 108. In some examples, the digital leaflet 102 includes multiple promotions 108. In the illustrated example of FIG. 1, the promotion 108 features one product. In some examples, the promotion 108 features more than one product. In the illustrated example of FIG. 1, the digital leaflet 102 was scraped from a retailer's website. However, the digital leaflet 102 can be in any suitable form, such as a scanned image, and from any suitable source, such as a website or a brick-and-mortar store. For example, the digital leaflet 102 may be a pamphlet from a brick-and-mortar store that has been scanned and converted into digital form. The example digital leaflet 102 is uploaded to the example cross-coding pipeline circuitry 106 to be processed and cross-coded with an example products datastore 110. In some examples, the digital leaflet 102 is uploaded directly to the cross-coding pipeline circuitry 106. In some examples, the digital leaflet 102 is uploaded to the cross-coding pipeline circuitry 106 via the example network 104.

In the illustrated example of FIG. 1, the network 104 is the Internet. However, the example network 104 may be implemented using any other network over which data can be transferred. The example network 104 may be implemented using any suitable wired and/or wireless network(s) including, for example, one or more data buses, one or more Local Area Networks (LANs), one or more wireless LANs, one or more cellular networks, one or more private networks, one or more public networks, among others. In additional or alternative examples, the network 104 is an enterprise network (e.g., within businesses, corporations, etc.), a home network, among others.

The example network 104 also enables the \cross-coding pipeline circuitry 106 to communicate with the products datastore 110. The products datastore 110 is storage circuitry that stores product-related data, such as information for a variety of products. Product information may include a product description, product image, product EAN code, etc.

In some examples, the products datastore 110 is Nielsen IQ's repositories, such as OGRDS, etc. Data of the products datastore 110 may be cross-coded with a variety of datasets, such as the digital leaflet data, sales data, etc. In operation, the cross-coding pipeline circuitry 106 communicates with the products datastore 110 to determine product candidates corresponding to the promotion 108 of the digital leaflet 102. While in the illustrated example of FIG. 1 the products datastore 110 is illustrated as a single datastore, the products datastore 110 may be implemented by any number and/or type(s) of datastores. Furthermore, the data stored in the products datastore 110 may be in any data format such as, for example, binary data, comma delimited data, tab delimited data, structured query language (SQL) structures, an executable (e.g., an executable binary, a configuration image, etc.), etc.

In the illustrated example of FIG. 1, the cross-coding pipeline is implemented by the example cross-coding pipeline circuitry 106 of FIG. 1, which is structured to process a digital leaflet 102 to determine which product(s) is being promoted in the digital leaflet 102 and to cross-code any products appearing in a digital leaflet 102 with the products datastore 110. As disclosed herein, to cross-code products means to apply a code (e.g., a standardized numeric identifier, an alphanumeric identifier, a barcode, a European Article Number (EAN), etc.) to the data corresponding to the product appearing in the promotion that directs a user to pertinent information at another location, such as an EAN database, other databases having information concerning the product, etc. In other words, cross-coding means applying code that enables a user to cross-reference between databases. Cross-coding products that are being promoted in a digital leaflet 102 with a products datastore 110 may enable a marketing intelligence company to extract actionable information for use by manufacturers and retailers. For example, a product in a dataset of the products datastore 110 may be cross-coded with a promotion 108 appearing in a retailer's digital leaflet 102 as well as with the retailer's sales data for that product. Such cross-coding can give the retailer a bigger picture of how the product promotion appearing in a digital leaflet 102 correlates to an increase in sales of that product. For example, a retailer may compare sales data for the product after it was promoted using a percent-off reduction type and after it was promoted using a buy-one-get-one (BOGO) reduction type to determine which type of promotion is more effective.

The digital leaflet 102 is run through the leaflet cross-coding pipeline (e.g., the cross-coding pipeline circuitry 106) to be processed and cross-coded. As discussed above, processing the digital leaflet 102 involves various stages, including detecting and classifying regions (e.g., a whole_promo region 126, a product image 128, a description 130, a price_promo 132, etc.) of a promotion 108 appearing in the digital leaflet 102, extracting text from the detected and classified regions, predicting facts (e.g., promotion type, reduction type, etc.) and search attributes (e.g., product category, brand, etc.) of a product appearing in the promotion based on the extracted text, generating possible product candidates corresponding to the product appearing in the promotion, and matching a product candidate with the promotion 108 appearing in the digital leaflet 102. Accordingly, the example cross-coding pipeline circuitry 106 includes example regions detections and classification circuitry 112, example text extraction circuitry 114, example fact coding circuitry 116, example candidate determining circuitry 118, example product matching circuitry 120, and an example database 122. In some examples, the regions detection and classification circuitry 112 and the text extraction circuitry 114 are considered a "textual field extraction" circuit. The regions detection and classification circuitry 112 in combination with the text extraction circuitry 114 converts the digital leaflet 102 from a raw image into its individual textual features. The cross-coding pipeline circuitry 106 then uses the extracted textual features to predict facts and search attributes of the product appearing in the promotion 108.

The example regions detection and classification circuitry 112 is structured to detect and classify regions of interest of a promotion 108 appearing in the digital leaflet 102. To do so, the regions detection and classification circuitry 112 applies an AI-based model to the digital leaflet 102 to detect and classify the regions of interest as they appear in the promotion 108. Detecting and classifying regions of the digital leaflet 102 is a helpful stage in processing a digital leaflet 102 because subsequent processing stages rely on the outputs given by the regions detection and classification circuitry 112. In the illustrated example of FIG. 1, the regions detection and classification circuitry 112 is structured to detect and classify regions appearing in the example promotion 108 of the digital leaflet 102. That is, the regions detection and classification circuitry 112 is structured to detect and classify a "whole_promo" region 126, a "product_image" region 128, a "description" region 130, and a "price_promo" region 132. However, the regions of interest may change depending on the country from which the digital leaflet 102 is produced. In some examples, the regions detection and classification circuitry 112 may be structured to detect and classify more regions, less regions, and/or different regions of the promotion 108 appearing in a digital leaflet 102.

The example text extraction circuitry 114 is structured to extract textual data from the regions detected by the regions detection and classification circuitry 112. The text extraction circuitry 114 applies a technique based on OCR with a goal of recognizing text associated with the regions previously detected and classified. In other words, the text extraction circuitry 114 utilizes OCR to transform the digital leaflet 102 into machine-readable text data. In some examples, text recognized by the OCR is post-processed via human intervention to find and correct potential errors resulting from the OCR. For example, the OCR may include errors associated with strange symbols that were incorrectly detected, errors derived from lower/upper case letters, dictionary-based errors, etc.

The example fact coding circuitry 116 is structured to predict (e.g., extract) facts to be coded for the promotion 108. To do so, the fact coding circuitry 116 applies an AI-based model to the extracted textual features to predict a target fact attribute of the promotion 108. In the illustrated example of FIG. 1, the fact coding circuitry 116 predicts the target fact attribute as a pre-defined fact category, herein referred to as a fact value. The fact coding circuitry 116 outputs a fact value corresponding to a category of the promotion 108 appearing in the digital leaflet 102. For example, a fact category may be a reduction type, promotion type, etc. In some examples, the fact coding circuitry 116 predicts the target fact attribute as an entity. For example, an entity may be a specific dollar-off promotion, a specific promotion for receiving a gift card in exchange for purchasing a specific item, etc.

In the illustrated example of FIG. 1, the fact prediction circuitry 116 has a single-label taxonomy. That is, a single fact value is predicted per promotion 108 appearing in the digital leaflet 102. For example, a single-label fact value could be based on a reduction type of the promotion (e.g., percent off), promotion type (e.g., Buy-One-Get-One (BOGO)), etc. Examples of reduction types include bargain, percent off, etc. In some examples, the fact coding circuitry 116 has a multi-label taxonomy. In such examples, multiple fact values may be predicted per promotion 108 appearing in the digital leaflet 102. For example, a multi-label taxonomy for a promotion 108 of a digital leaflet 102 could include a promotion price of the product and a promotion type. A multi-label taxonomy is also defined multi-output. A multi-label taxonomy is multi-output if multiple attributes are predicted by the same AI model. Table 1, below, illustrates examples of target attribute types, label taxonomies, and models corresponding to leaflets used in the US and in Poland.

TABLE 1

Facts to Predict and their Properties

| COUNTRY | TYPE | TAXONOMY | MODEL |
| --- | --- | --- | --- |
| Poland | Category | Single-Label | Reduction Type |
| US | Category | Single-Label | Promotion Type |
|  | Entity | Multi-Label | Price and |
|  |  | Multi-Output | Promotion: |
|  |  |  | (e.g., buy price and |
|  |  |  | buy quantity, get |
|  |  |  | price and get |
|  |  |  | quantity, etc.) |

In some examples, a predicted fact value comes with a confidence score.

The example candidate determining circuitry 118 is structured to predict search attributes corresponding to a product appearing in the promotion 108. The candidate determining circuitry 118 is also structured to search the attributes against the products datastore 110 to generate product candidates. In the illustrated example of FIG. 1, the candidate determining circuitry 118 applies an AI-based model to the extracted textual features to predict a target search attribute of the promotion 108, similar to the fact coding circuitry 116. In the illustrated example of FIG. 1, the candidate determining circuitry 118 predicts a target search attribute as a pre-defined category. The candidate determining circuitry 118 outputs a search attribute value for a search attribute. In the illustrated example of FIG. 1, the AI-based model has multiple categories, including brand, product class, product category, etc. In some examples, the AI-based model only has one category. In some examples, the candidate determining circuitry 118 predicts the target search attribute as an entity.

In the illustrated example of FIG. 1, the candidate determining circuitry 118 has a single-label taxonomy. Accordingly, a single search attribute value is predicted for each category. In some examples, the candidate determining circuitry 118 has a multi-label taxonomy. For example, a digital leaflet 102 from Poland may apply an AI-based model that has a multi-label taxonomy. Table 2, below, illustrate examples of target attribute types, label taxonomies, and models for labels used in the US and in Poland.

TABLE 2

Attribute to Predict and their Properties

| COUNTRY | TYPE | TAXONOMY | MODEL |
|---|---|---|---|
| Poland | Category | Multi-Label | Product Class |
| US | Category | Multi-Label | Brand |
|  | Category | Single-Label | Product Category |

In some examples, a predicted search attribute comes with a confidence score.

The example candidate determining circuitry 118 searches the predicted search attributes against the products datastore 110 to generate a dataset of product candidates. The candidate determining circuitry 118 outputs a dataset of product candidates corresponding to the product appearing in the promotion 108. In some examples, the ones of the product candidates are each associated with a specific EAN. In some examples, the candidate determining circuitry 118 generates a dataset of product candidates having a tuple for each product candidate. As disclosed herein, a tuple is a finite ordered list of elements. A candidate product text tuple includes, for example, product EAN, candidate brand, etc.

A goal of the example cross-coding pipeline circuitry 106 is to match a product appearing in the promotion 108 with the product's EAN as it is in the product's datastore 110. Prior to processing a digital leaflet 102, the product appearing in the promotion 108 could correspond to any number of products in the products datastore 110. Once the facts and search attributes have been predicted or extracted and used to gather product candidates, a number of product candidates is narrowed down without losing any true match. That is, the number of potential products from the products datastore 110 that correspond to the product appearing in the digital leaflet has been narrowed down in such a manner as to not eliminate the product that appears in the digital leaflet. However, the cross-coding pipeline circuitry 106 must still remove false positives from the dataset of product candidates. Accordingly, the example product matching circuitry 120 is structured to rank the product candidates and to select a product that corresponds to the promotion 108. The product matching circuitry 120 receives the dataset of product candidates in tuple form as an input. The product matching circuitry 120 applies an AI-based model that is trained to determine whether a text tuple corresponds to the same entity or not (e.g., whether the text tuple corresponding to a product is the same product in the promotion 108). The product matching circuitry 120 selects a text tuple and generates a prediction of whether the product candidate is a match or a mismatch. Each match or mismatch prediction includes a calculated confidence score. After determining whether each tuple in the dataset of product candidates is a match or a mismatch, and providing each prediction with a calculated confidence score, the product matching circuitry 120 selects text tuple as the product appearing in the promotion 108. In the illustrated example of FIG. 1, the product matching circuitry 120 selects the matching tuple with the highest confidence score. The selected product candidate is then associated with the promotion 108 appearing in the digital leaflet 102.

The cross-coding pipeline circuitry 106 of FIG. 1 also includes an example database 122. In the illustrated example of FIG. 1, the database 122 is located within the cross-coding pipeline circuitry 106. In some examples, the database 122 is located external to the cross-coding pipeline circuitry 106 in a location accessible to the cross-coding pipeline circuitry 106. The database 122 is structured to store information and/or data associated with the cross-coding pipeline circuitry 106. For example, the database 122 can store the digital leaflet 102 along with each promotion 108. The example database 122 may be implemented as any type of storage device. Furthermore, the data stored in the database 122 may be in any data format such as, for example, binary data, comma delimited data, tab delimited data, structured query language (SQL) structures, an executable (e.g., an executable binary, a configuration image, etc.), etc.

Figure 2:
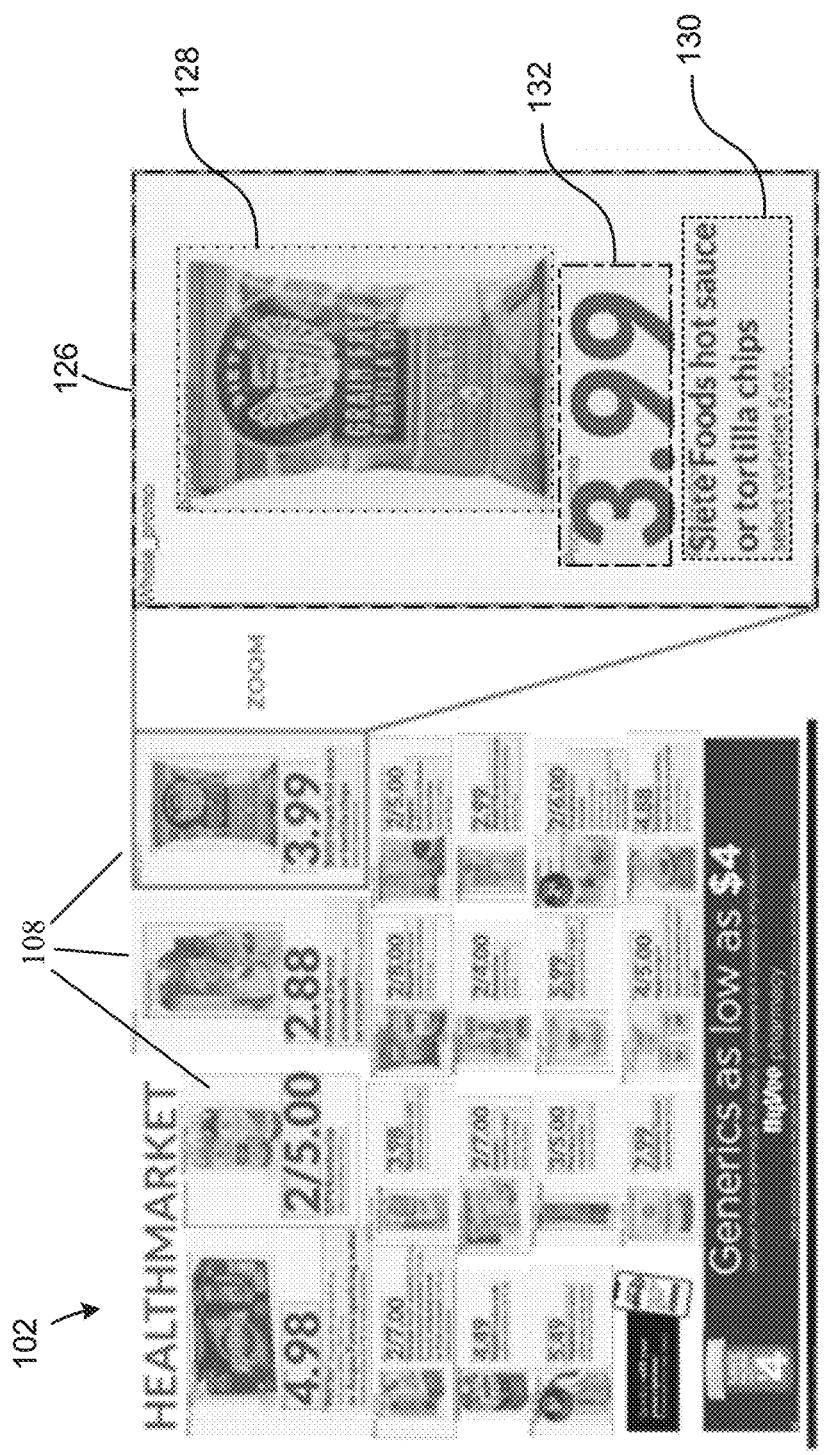
FIG. 2 illustrates an example digital leaflet including an enlarged example promotion having detected and classified regions in accordance with the teachings of this disclosure.

FIG. 2 is an illustration of an example digital leaflet 102 that may be input into the cross-coding pipeline circuitry 106 of FIG. 1. The digital leaflet 102 is from retailer Hy-Vee. The digital leaflet 102 includes a plurality promotions 108 from Hy-Vee's Health market. FIG. 2 includes an enlarged image of a promotion 108 for tortilla chips. In response to the digital leaflet 102 being input into cross-coding pipeline circuitry 106, the regions detection and classification circuitry 112 applies an R-CNN to the image to detect and classify regions of interest. At least one goal of the regions detection and classification circuitry 112 is to recognize and determine image regions that contain specific standard elements. Since the digital leaflet 102 is from the United States, the four regions of interest include a whole_promo 126 region, a product_image region 128, a description region 130, and a price_promo region 132. These four labels are common for many countries. However, the regions detection and classification circuitry 112 can be modified to detect and classify regions of interest of another country additionally or alternatively.

A whole_promo 126 region contains a whole promotion for a specific product. Accordingly, a digital leaflet 102 will have any number of whole_promo regions 126 that corresponds to the number of promotions 108 contained in the digital leaflet 102. In the illustrated example of FIG. 2, the whole_promo 126 region corresponds to a promotion 108 for grain free tortilla chips. The product_image region 128 marks a location of an image of the product corresponding to the promotion 108. In the illustrated example of FIG. 2, a location of an image of the tortilla chips is marked by the product_image region 128.

A description region 130 indicates a zone of the promotion 108 having that describes the product. The example description region 130 may include more information that is pictured in the image regions. In the illustrated example of FIG. 2, the description region 130 reads "Siete Foods hot sauce or tortilla chips select varieties 5 oz." Accordingly, the description region 130 includes hot sauce, which is not pictured in the image region 128. The price_promo region 132 determines a zone where a price and/or promotional value is located with the promotion 108. In the illustrated example of FIG. 2, the price_promo 132 reads "3.99" as a price. From the detected and classified regions, it becomes clear that the promotion 108 corresponds to Siete Foods hot sauce or tortilla chips, wherein select varieties of 5 oz are promoted at a price of 3.99.

Figure 3:
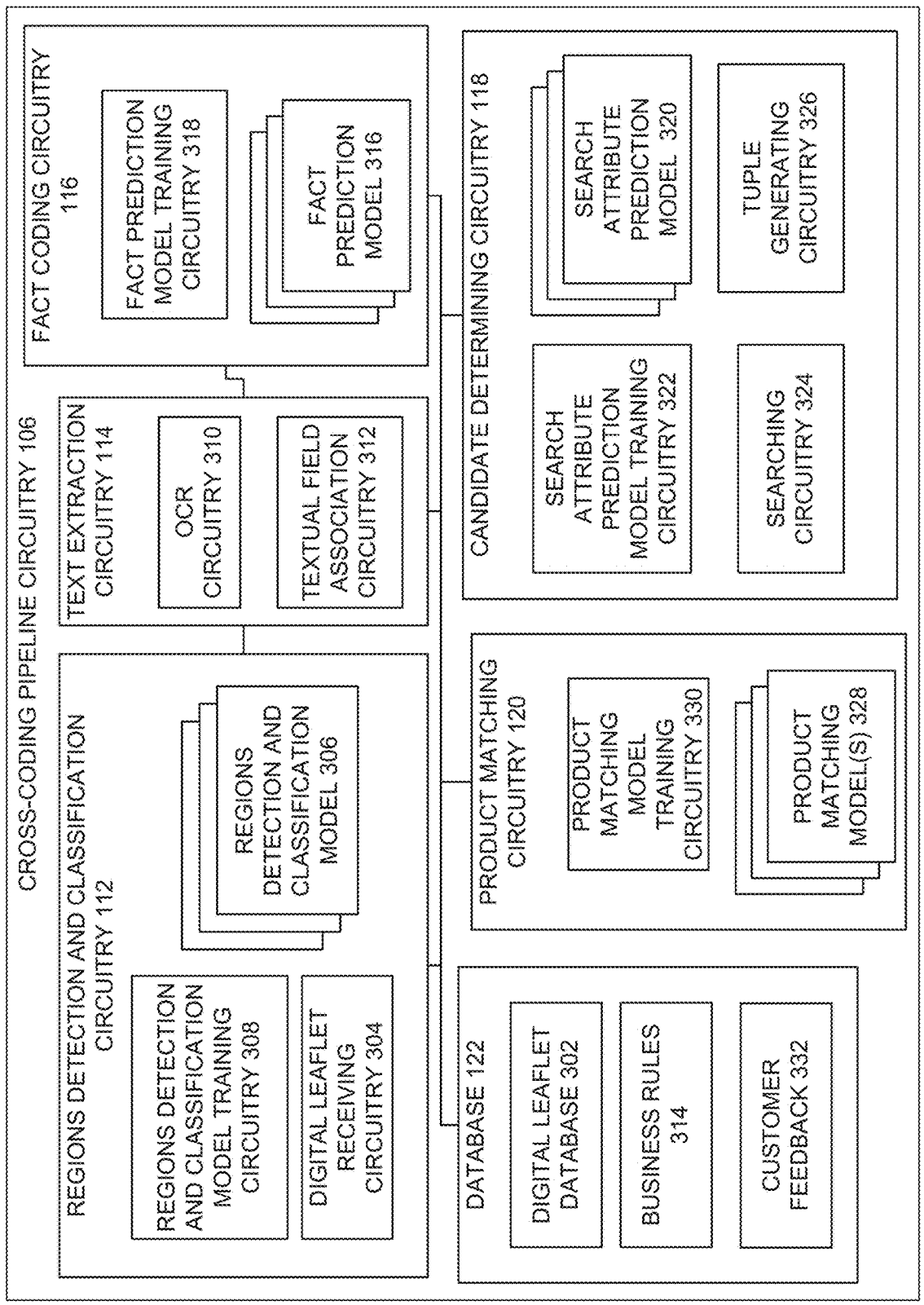
FIG. 3 is block diagram of the example cross-coding pipeline circuitry of FIG. 1 structured to cross-code a digital leaflet in accordance with the teachings of this disclosure.

FIG. 3 is a block diagram of the example cross-coding pipeline circuitry 106 of FIG. 1. The example cross-coding pipeline circuitry 106 receives and/or otherwise retrieves a digital leaflet 102 as an image and processes the digital leaflet 102 to predict facts and determine which products are being promoted in the digital leaflet 102. The products promoted in the digital leaflet 102 can then be cross-coded against other datasets, such as dataset of products having associated EANs in the products datastore 110. In the illustrated example of FIG. 3, a digital leaflet database 302 is stored within the example database 122. The example digital leaflet database 302 stores a digital leaflet and the data generated based on the digital leaflet 102. In some examples, metadata is generated and stored with the digital leaflet 102 in the digital leaflet database 302. For example, the metadata may include general information about the digital leaflet 102, including a digital leaflet 102 date, retailer, region, etc. The metadata may be generated using any suitable method, such as metadata generating circuitry, applying a ML model, pre-processing via a human, etc.

The example regions detections and classification circuitry 112 includes digital leaflet receiving circuitry 304, an example regions detection and classification model(s) 306, and example regions detection and classification model training circuitry 308. The example digital leaflet receiving circuitry 304 is structured to receive a digital leaflet 102 as an input. Upon receiving the digital leaflet 102 as an input image, the regions detection and classification circuitry 112 applies a regions detection and classification model 306 to the digital leaflet 102 to detect and classify regions of interest for a promotion (e.g., promotion 108) appearing in the digital leaflet 102. The regions detection and classification model 306 is an AI recognition model based on computer vision algorithms that focus on object detection and classification techniques. In the illustrated example of FIG. 3, the regions detection and classification model 306 is based on an R-CNN model. The R-CNN model takes an input image and produces a set of bounding boxes as an output. The bounding boxes contain an object (e.g., the region) and a category (e.g., the classification). The bounding boxes output by the regions detection and classification model 306 correspond to the regions of interest, described above.

The example regions detection and classification model 306 is trained by the example regions detection and classification model training circuitry 308. In the illustrated example of FIG. 3, the regions detection and classification model training circuitry 308 is located within the regions detection and classification circuitry 112. In some examples, the regions detection and classification training circuitry 308 is located external to the regions detection and classification circuitry 112 and transfers trained region detection and classification models 306 to the regions detection and classification circuitry 112. The regions detection and classification model training circuitry 308 is structured to train an AI model to detect and classify regions of interest corresponding to a promotion 108. In the illustrated example of FIG. 3, the regions detection and classification model training circuitry 308 applies an architecture that is based on an R-CNN approach. Whereas a CNN is mainly based on image classification, an R-CNN is based on object detection, which combines localization and classification. In R-CNN, the model architecture is forced to focus on a single region at a time because it is expected that only a single object of interest will dominate in a given region. The example regions detection and classification model training circuitry 308 trains a R-CNN architecture using previously labeled data from leaflets. For example, the regions detection and classification model training circuitry 308 in the illustrated example of FIG. 3 uses previously labeled data from leaflets (e.g., processed by a labeling team). During training, and in operations, the regions within an input image are first detected by a selective search algorithm. Prior to the regions being fed to the CNN, the regions are adjusted so that they are of equal size. The regions are then fed to a CNN for classification and bounding box regression.

Other techniques for training a region detection and classification model 306 may be used by the regions detection and classification model training circuitry 308 additionally or alternatively. In some examples, the regions detection and classification model training circuitry 308 may apply a Faster-R-CNN technique. Accordingly, some examples employ a regions proposal network (RPN). In some examples, a You Only Look Once (YOLO) approach for object detection may be used by the regions detection and classification model training circuitry 308. YOLO is a technique for object detection which is focused on Single Shot Detection (SSD).

The example text extraction circuitry 114 is structured to extract textual data from each region detected by the regions detection and classification circuitry 112. As such, the text extraction circuitry includes example OCR circuitry 310 and example textual field association circuitry 312. The OCR circuitry 310 receives the digital leaflet 102 and applies an OCR-based algorithm over the previously detected regions of interest to obtain the text of interest. OCR is a field in the intersection of CV and NLP (e.g., OCR includes aspects corresponding to CV techniques and to NLP techniques). The human visual system reads text by recognizing patterns of light and dark, translating those patterns into characters and words, and then attaching meaning to it. OCR attempts to mimic the human visual system by using neural networks. Techniques based on OCR examine images pixel by pixel, looking for shapes that match the character traits. In the illustrated example of FIG. 3, the OCR circuitry 310 utilizes tesseract OCR. Tesseract OCR is an open-source approach to OCR. However, any suitable OCR technique may be used additionally or alternatively, including Google OCR, etc.

After applying an OCR-based algorithm over the regions of interest in the promotion 108, the OCR circuitry 310 returns the characters and words (e.g., textual data) obtained from leaflet images as well as their locations. The example textual field association circuitry 312 is structured to associate the textual data obtained from the OCR circuitry 310 with the previously detected and classified regions of interest. In doing so, the example textual field association circuitry 312 uses a respective location of a textual data feature and matches the feature with its corresponding region of interest (e.g., whole_promo 126, description 130, and price_promo 132.) In doing so, textual field association circuitry 312 applies business rules to achieve the matching between the textual data feature and detected regions for the four classes classified in the previous stage. Accordingly, example business rules 314 are stored in the database 122. The business rules 314 enable the cross-coding pipeline circuitry 106 to optimize the whole_promo regions by considering that a whole_promo region has a product_image, description and price_promo region. By considering this rule, the whole_promo regions are fitted to their internal sub-regions by considering this business rule.

The fact coding circuitry 116 is structured to predict facts to code for each promotion 108 in the digital leaflet 102. The fact coding circuitry 116 includes an example fact prediction model(s) 316 and example fact prediction model training circuitry 318, which is structured to train fact prediction models 316. In some examples, the fact coding circuitry 116 includes any number of fact prediction models 316. For example, the fact coding circuitry 116 may include a fact prediction model 316 for each country in which a digital leaflet 102 may have been produced. Further, the fact coding circuitry 116 may include a fact prediction model 316 for a fact attribute category and a fact attribute entity. The fact coding circuitry 116 selects an appropriate model based on a region where the digital leaflet 102 and/or whether the process seeks to predict a fact attribute as a category or an entity. The below discussion is geared towards a US fact prediction model 316, but examples disclosed herein are not limited thereto.

As discussed above, the example fact coding circuitry 116 predicts a target fact attribute as a pre-defined fact category. The fact coding circuitry 116 applies a fact prediction model 316 to the extracted textual features to determine a categorial fact value corresponding to the promotion 108, such as reduction type, promotion type, etc. The categorical attribute is a fact value from a list of possible fact values. For example, a reduction-type categorical model may have fact values, including percent off, etc.

The fact prediction model 316 of the illustrated example is an NLP model based on an AI approach for text classification. At least one goal of text classification is to assign a document (e.g., promotion) to one or more categories. The fact prediction model 316 combines the OCR output for each region within the promotion 108 with traditional text normalization techniques (e.g., regular expressions, etc.). The architecture applied by the fact prediction model 316 is a Multi-Layer Perceptron (MLP). However, architectures may be used additionally or alternatively, including a CNN, logistic regression etc. An MLP is an artificial neural network (ANN) that performs binary classification. The MLP predicts whether input text belongs to a certain category of interest. The MLP of the illustrated examples includes of an input layer to receive the text, an output layer that makes a decision or prediction about the input text, and a number of hidden layers between the input and output layers that perform a classification computation. The vectorized representations are computed at character n-gram level. In operation, the MLP learns an embedded vectorial representation (e.g., a function) from input text. The vectorial representations are then mapped into a labels set (e.g., the fact values) by averaging the embeddings of all the characters in a sentence. Because MLP computes vectorized representations at the character n-gram level, errors produced during the OCR stage are better managed than vectorized representations computed at a word n-gram level. The fact prediction model 316 predicts a probability for each predicted label by applying a softmax operation to the vectorized representations.

In examples in which the fact predicting model 316 is applied to the extracted textual fields to determine an entity fact attribute, the fact predicting model 316 is an NLP model based on an AI approach for information extraction. In such examples, a more complex computation is applied by the fact prediction model 316 because the predicted outputs are directly extracted from the textual information. Categorical types do not have this difficulty because they are just a list of possible values from a catalogue. The architecture applied by an information extraction based NLP model may be a deep learning model based on a combination of bi-directional Long Short-Term Memory (Bi-LSTM) and a Conditional Random Field (CRM) (e.g., Bi-LSTM-CRF) design. However, another information extraction based model may be used additionally or alternatively, such as a model based on unsupervised machine learning, a crowd-assisted model, etc. A Bi-LSTM-CFR) included an input layer, a sub-word imbedding layer, a Bi-LSTM-CRF layer, and an output layer. Input data is represented via embeddings at sub-word level as in the text classification model. The embeddings are processed at the bi-LSTM-CFR layer. The model outputs extracted attributes. In examples in which the fact predicting model 316 determines an entity type attribute, the entity prediction is post-processed to fulfil business requirements. A post-processing method may relate to numeric normalization, currency normalization, etc.

The example fact prediction model training circuitry 318 trains the fact prediction model 316. In the illustrated example of FIG. 3, the fact prediction model training circuitry 318 is located within the fact coding circuitry 116. In some examples, the fact prediction model training circuitry 318 is located external to the fact coding circuitry 116 and transfers trained fact prediction models 316 to the fact coding circuitry 116. The fact prediction model training circuitry 318 is structured to train an AI model to predict a fact value for the promotion 108 for coding. The fact predication model training circuitry 318 is structured to train a fact prediction model 316 based on a country's standards. For example, the fact prediction model training circuitry 318 may train a model for the US different than a model for Poland.

In the illustrated example of FIG. 3, the fact prediction model training circuitry 318 applies an architecture based on text classification. During training, fact attribute data is unlinked from the promotion 108 data in the fact prediction model training circuitry 318. During training, the fact prediction model training circuitry 318 associates (e.g., assigns) the extracted textual features from the promotion 108 with a target attribute via a heuristic technique. Although the predicted target attribute is coded along with its human-defined visual region, the textual features were extracted from predicted regions in the image. Accordingly, for US models, the fact prediction model training circuitry 318 performs a set of region association algorithms. In some examples, the association problem is more complicated. For example, training fact prediction models 316 for Poland requires the association problem to be done via string or semantic similarity methods, which is a challenging AI task due to fine-grained patterns in the promotions. Moreover, once attribute databases are linked to the textual input information, entity extraction methods require an additional effort because the annotations require a location of each entity in the text. This issue can be avoided by implementing a Distant Supervision method such as performing a fuzzy search of the targets to predict within the input text.

The trained fact prediction model 316 outputs a predicted fact value and a calculated confidence score corresponding to the fact value. In some examples, the confidence score is used to calibrate the predictions and to select the optimal working point for the business in order to optimize some metric (money, saved time, etc.). In some examples, the fact prediction model training circuitry 318 the confidence thresholds are computed for that purpose.

The candidate determining circuitry 118 is structured to extract search attributes to be searched against the product datastore 110 in order to generate product candidates. The candidate determining circuitry 118 includes an example search attribute prediction model(s) 320, example search attribute model training circuitry 322, searching circuitry 324, and tuple generating circuitry 326. In some examples, the candidate determining circuitry 118 includes a numerous search attribute prediction models 320. For example, the candidate determining circuitry 118 may include a search attribute prediction model 320 for each country in which a digital leaflet 102 may have been produced. Further, the candidate determining circuitry 118 may include a search attribute prediction model 320 for a search attribute category and a search attribute entity. The candidate determining circuitry 118 selects an appropriate model based on a region where the digital leaflet 102 and/or whether the process seeks to predict a fact attribute as a category or an entity. The below discussion is geared towards a US search attribute prediction model 320.

As discussed above, the candidate determining circuitry 118 predicts a target search attribute as a pre-defined search attribute category in the illustrated example of FIG. 3. The candidate determining circuitry 118 applies a search attribute prediction model 320 to the extracted textual features to determine a categorial search attribute value corresponding to a product appearing in the promotion 108, such as brand, product class, etc. The categorical attribute is a search value from a list of possible fact values.

The search attribute prediction model 320 of the illustrated example is similar to the fact prediction model 316 of the fact coding circuitry 116. The search attribute prediction model 320 is an NLP model based on an AI approach for text classification. Similar to the fact prediction model 316, the search attribute prediction model 320 combines the OCR output for each region within the promotion 108 with traditional text normalization techniques (e.g., regular expressions, etc.). In the illustrated example of FIG. 3, the architecture applied by the search attribute prediction model 320 is an MLP. However, other architectures may be used additionally or alternatively including a CNN, logistic regression etc. In operation, the search attribute prediction model 320 operates similar to the fact prediction model 308, with different classification categories. The search attribute prediction model 320 predicts a probability for each predicted label by applying a softmax operation to the vectorized representations.

In examples in which the search attribute prediction model 320 is applied to the extracted textual fields to determine an entity search attribute, the search attribute prediction model 320 is an NLP model based on an AI approach for information extraction. Similar to the fact prediction model 316, the architecture applied by an information extraction based NLP model is a deep learning model based on a Bi-LSTM-CRF design. Input data is represented via embeddings at sub-word level as in the text classification model. Additionally, in examples in which the search attribute prediction model 320 determines an entity type attribute, the entity prediction is post-processed to fulfil business requirements. A post-processing method may related to numeric normalization, currency normalization, etc.

The example search attribute prediction model training circuitry 322 trains the search attribute prediction model 320. In some examples, the search attribute prediction models 320 and fact predictions model 316 are trained using the same training circuitry. This is because the fact prediction training circuitry 316 and the search attribute prediction training circuitry 320 apply the same training architectures in some examples. In such examples, different training images are used. In the illustrated example of FIG. 3, the search attribute prediction model training circuitry 322 is located within the candidate determining circuitry 118. In some examples, the search attribute prediction model training circuitry 322 is located external to the candidate determining circuitry 118 and transfers trained search attribute prediction models 320 to the candidate determining circuitry 118. The search attribute prediction model training circuitry 322 is structured to train an AI model to predict a search value for a product appearing in the promotion 108. The search attribute prediction model training circuitry 322 is structured to train a search attribute prediction model 320 based on a country's standards.

In the illustrated example of FIG. 3, the search attribute prediction model training circuitry 322 operates in the same manner as the fact prediction model training circuitry 316. That is, the search attribute prediction model training circuitry 322 applies an architecture based on text classification wherein search attribute data is unlinked from the promotion 108 data in the search attribute prediction model training circuitry 322. During training, the search attribute prediction model training circuitry 322 annotates the extracted textual features from the promotion 108 with a set of attributes via a heuristic technique.

The trained search attribute prediction model 318 outputs a predicted search value and a calculated confidence score corresponding to the search value. In some examples, the confidence score is used to calibrate the predictions and to select the optimal working point for the business in order to optimize some metric (money, saved time, etc.). In some examples, the search attribute prediction model training circuitry 322 the confidence thresholds are computed for that purpose.

The candidate determining circuitry 118 searches the predicted search attributes against the products datastore 110. Accordingly, the candidate determining circuitry 118 includes searching circuitry 324 and tuple generating circuitry 326. The searching circuitry 324 receives a list of search attribute values from the search attribute prediction model 320. The searching circuitry 324 is structured to then search the list of search attribute values against the product datastore 110. The searching circuitry 324 outputs a dataset of product candidates corresponding to the product appearing in the promotion 108. The tuple generating circuitry 326 inputs the dataset of product candidates and outputs the dataset in tuple form.

The example product matching circuitry 120 is structured to rank the product candidates, to select a product that corresponds to the promotion 108, and to cross-code the selected product with the products datastore 110. The products datastore 110 may include a large number and variety of products. The computational cost and time it would take for the product matching circuitry 120 to determine a match/mismatch score for each product in the products datastore 110 could be astronomical. Accordingly, the candidate determining circuitry 118 may be considered as a pre-processing step for an EAN cross-coding task. The candidate determining circuitry 118 is necessary because the amount of product candidates for each promotion is huge and complex.

The product matching circuitry 120 determines whether a text tuple corresponds to the product appearing in the promotion 108. The product matching circuitry 120 includes an example product matching model 328 and example product matching model training circuitry 330. The product matching circuitry 120 receives the dataset of product candidates as an input and applies the product matching model 328 to the dataset. The product matching models ranks the product candidates and selects a product candidate based on a matching score. The product matching model 330 has an approach that is based on an NLP model for text similarity. An input text tuple contains one product candidate. The input text tuple is processed at sub-word level in vector representations, similar to the fact prediction model 316 and the search attribute prediction models 320. In a product matching model 328, the text tuple is to be further processed by Deep Learning architecture with sequence modeling and attention mechanisms. Finally, a classification layer of the product matching model 328 computes a prediction of whether the text tuple is a match or not. The product matching model 328 ranks the input text tuples based on their match or mismatch scores and confidence scores. The product matching model 328 selects the highest ranked product candidate to associate with the promotion 108. The product matching circuitry 120 saves the results.

The example product matching model training circuitry 330 is structured to train the product matching model 328. In some examples, the training dataset and the test dataset are generated in different manners. In the illustrated example of FIG. 3, the product matching model training circuitry 330 applies a supervised learning architecture. The product matching model training circuitry 330 trains the product matching model 328 using the training dataset of images and tests the product matching model 328 using a test dataset of images. The training dataset is large compared to the test dataset and the training datasets of the other models in the pipeline. The large training data is used in order to properly train the product matching model 328 because the amount of potential products is so large. The training dataset of images include match and mismatch predictions for the ones of the dataset. In the illustrated example of FIG. 3, the test dataset is of high quality in order to obtain a realistic evaluation of the product matching model 328. In the examples disclosed herein, the test dataset of medium size.

In some examples, the product matching model training circuitry 330 applies an unsupervised (match/mismatch labels are not required) technique including string similarity methods such as Levenshtein distance, Smith Waterman similarity, etc. and vector similarity techniques such as sub-word embeddings, etc. Example approaches range from traditional Machine Learning (ML) methods, such as Support Vector Machines (SVM), Logistic Regression (LR), etc. to Deep Learning (DL) approaches based on stacked Multi Layered Perceptrons (MLPs), Recurrent Neural Networks (RNNs) and Attention modules. In some examples, a Transformer architecture is applied.

In some examples, the cross-coding pipeline circuitry 106 includes means for detecting and classifying regions of interest. For example, the means for detecting and classifying regions of interest may be implemented by regions detection and classification circuitry 112. In some examples, the regions detection and classification circuitry 112 may be implemented by machine executable instructions such as that implemented by at least blocks 504 of FIG. 5 and 602 of FIG. 6 executed by processor circuitry, which may be implemented by the example processor circuitry 412 of FIG. 4, the example processor circuitry 1100 of FIG. 11, and/or the example Field Programmable Gate Array (FPGA) circuitry 1200 of FIG. 12. In other examples, the regions detection and classification circuitry 112 is implemented by other hardware logic circuitry, hardware implemented state machines, and/or any other combination of hardware, software, and/or firmware. For example, the regions detection and classification circuitry 112 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the cross-coding pipeline circuitry 106 includes means for extracting machine readable text. For example, the means for extracting machine readable text may be implemented by text extraction circuitry 114. In some examples, the text extraction circuitry 114 may be implemented by machine executable instructions such as that implemented by at least blocks 504 of FIG. 5 and 606 of FIG. 6 executed by processor circuitry, which may be implemented by the example processor circuitry 412 of FIG. 4, the example processor circuitry 1100 of FIG. 11, and/or the example Field Programmable Gate Array (FPGA) circuitry 1200 of FIG. 12. In other examples, the text extraction circuitry 114 is implemented by other hardware logic circuitry, hardware implemented state machines, and/or any other combination of hardware, software, and/or firmware. For example, the text extraction circuitry 114 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the cross-coding pipeline circuitry 106 includes means for predicting facts to code for a promotion 108. For example, the means for predicting facts to code for a promotion 108 may be implemented by fact coding circuitry 116. In some examples, the fact coding circuitry 116 may be implemented by machine executable instructions such as that implemented by at least blocks 504 of FIG. 5, 608 of FIG. 6, and 702-704 of FIG. 7 and executed by processor circuitry, which may be implemented by the example processor circuitry 412 of FIG. 4, the example processor circuitry 1100 of FIG. 11, and/or the example Field Programmable Gate Array (FPGA) circuitry 1200 of FIG. 12. In other examples, the fact coding circuitry 116 is implemented by other hardware logic circuitry, hardware implemented state machines, and/or any other combination of hardware, software, and/or firmware. For example, the fact coding circuitry 116 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the cross-coding pipeline circuitry 106 includes means for extracting search attributes for a product appearing in a promotion 108. For example, the means for means for extracting search attributes for a product appearing in a promotion 108 may be implemented by candidate determining circuitry 118. In some examples, the candidate determining circuitry 118 may be implemented by machine executable instructions such as that implemented by at least blocks 504 of FIG. 5, 610 of FIG. 6, and 802-806 of FIG. 8 executed by processor circuitry, which may be implemented by the example processor circuitry 412 of FIG. 4, the example processor circuitry 1100 of FIG. 11, and/or the example Field Programmable Gate Array (FPGA) circuitry 1200 of FIG. 12. In other examples, the candidate determining circuitry 118 is implemented by other hardware logic circuitry, hardware implemented state machines, and/or any other combination of hardware, software, and/or firmware. For example, the candidate determining circuitry 118 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the cross-coding pipeline circuitry 106 includes means for searching the products datastore 110. For example, the means for searching the products datastore 110 may be implemented by searching circuitry 324. In some examples, the searching circuitry 324 may be implemented by machine executable instructions such as that implemented by at least blocks 504 of FIG. 5, 610 of FIG. 6, and 808-810 of FIG. 8 executed by processor circuitry, which may be implemented by the example processor circuitry 412 of FIG. 4, the example processor circuitry 1100 of FIG. 11, and/or the example Field Programmable Gate Array (FPGA) circuitry 1200 of FIG. 12. In other examples, the searching circuitry 324 is implemented by other hardware logic circuitry, hardware implemented state machines, and/or any other combination of hardware, software, and/or firmware. For example, the searching circuitry 324 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the cross-coding pipeline circuitry 106 includes means for ranking product candidates and selecting a candidate corresponding to the product appearing in the promotion 108. For example, the means for ranking product candidates and selecting a candidate corresponding to the product appearing in the promotion 108 may be implemented by product matching circuitry 120. In some examples, the product matching circuitry 120 may be implemented by machine executable instructions such as that implemented by at least blocks 504 of FIG. 5, 612 of FIG. 6, and 902-910 of FIG. 9 executed by processor circuitry, which may be implemented by the example processor circuitry 412 of FIG. 4, the example processor circuitry 1100 of FIG. 11, and/or the example Field Programmable Gate Array (FPGA) circuitry 1200 of FIG. 12. In other examples, the product matching circuitry 120 is implemented by other hardware logic circuitry, hardware implemented state machines, and/or any other combination of hardware, software, and/or firmware. For example, the product matching circuitry 120 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the cross-coding pipeline circuitry 106 of FIG. 1 is illustrated in FIG. 3, one or more of the elements, processes, and/or devices illustrated in FIG. 3 may be combined, divided, re-arranged, omitted, eliminated, and/or implemented in any other way. Further, the example regions detection and classification circuitry 112, the example digital leaflet receiving circuitry 304, the example region detection and classification model 306, the example regions detection and classification model training circuitry 308, the example text extraction circuitry 114, the example OCR Circuitry 310, the example textual field associated circuitry 312, the example fact coding circuitry 116, the example fact prediction model 316, the example fact prediction model training circuitry 318, the example candidate determining circuitry 118, the example search attribute prediction model 320, the example searching circuitry 322, the example tuple generating circuitry 324, the example text normalization circuitry 328, the example product matching circuitry 120, the example product matching model 330, the example product matching model training circuitry 230, and/or, more generally, the example cross-coding pipeline circuitry 106 of FIG. 3, may be implemented by hardware, software, firmware, and/or any combination of hardware, software, and/or firmware. Thus, for example, any of the example regions detection and classification circuitry 112, the example digital leaflet receiving circuitry 304, the example region detection and classification model 306, the example regions detection and classification model training circuitry 308, the example text extraction circuitry 114, the example OCR Circuitry 310, the example textual field associated circuitry 312, the example fact coding circuitry 116, the example fact prediction model 316, the example fact prediction model training circuitry 318, the example candidate determining circuitry 118, the example search attribute prediction model 320, the example searching circuitry 322, the example tuple generating circuitry 324, the example text normalization circuitry 328, the example product matching circuitry 120, the example product matching model 330, the example product matching model training circuitry 230, and/or, more generally, the example cross-coding pipeline circuitry 106, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example regions detection and classification circuitry 112, the example digital leaflet receiving circuitry 304, the example region detection and classification model 306, the example regions detection and classification model training circuitry 308, the example text extraction circuitry 114, the example OCR Circuitry 310, the example textual field associated circuitry 312, the example fact coding circuitry 116, the example fact prediction model 316, the example fact prediction model training circuitry 318, the example candidate determining circuitry 118, the example search attribute prediction model 320, the example searching circuitry 322, the example tuple generating circuitry 324, the example text normalization circuitry 328, the example product matching circuitry 120, the example product matching model 330, the example product matching model training circuitry 230 is/are hereby expressly defined to include a non-transitory computer readable storage device or storage disk such as a memory, a digital versatile disk (DVD), a compact disk (CD), a Blu-ray disk, etc., including the software and/or firmware. Further still, the example cross-coding pipeline circuitry 106 of FIG. 1 may include one or more elements, processes, and/or devices in addition to, or instead of, those illustrated in FIG. 3, and/or may include more than one of any or all of the illustrated elements, processes and devices.

Figure 4:
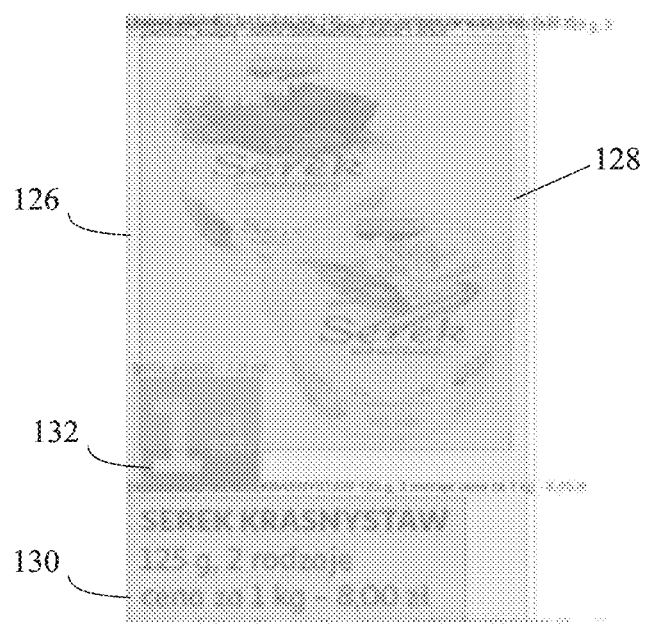
FIG. 4 is an illustration of an example promotion that may be processed by the example leaflet coding system circuitry of FIGS. 1 and/or 3.

FIG. 4 is an illustration of an example promotion (e.g., promotion 108) for which the cross-coding pipeline circuitry 106 may be applied. FIG. 4 is an example promotion 108 for Serek Kransnystaw. FIG. 4 illustrates the example promotion 108 after the regions detection and classification circuitry 112 applies a regions detection and classification model 306. FIG. 4 includes a whole_promo 126, product_image 128, product description 130, and price_promo 132.

The text extraction circuitry 114 applies OCR circuitry 310 to the promotion 108 to extract textual data. The textual field associate circuitry 312 then associates the textual data with specific regions to generate textual features. The fact coding circuitry 116 receives the textual features and applies a fact prediction model 316 to predict fact attribute values. In the illustrated example of FIG. 4, the fact prediction model 316 is structured to predict a reduction type category. Accordingly, the fact prediction models determines the reduction type of the promotion 108 of FIG. 4 as a "bargain."

The candidate determining circuitry 118 applies a search attribute prediction model 320 to the extracted textual features. In the illustrated example of FIG. 4, the search attribute prediction model 320 is structured to predict a product class category and a brand category. Accordingly, the search attribute prediction model 320 outputs "fromage frais/sweet cheese" as the product class category and "Kransnystaw" as the brand category. The searching circuitry of the candidate determining circuitry 118 searches the product datastore 110 to determine a product candidate. For example, a product candidate in the illustrated example of FIG. 4 is "krasnystaw serek homogenizowany wnl pdl 1x0125." The product matching circuitry 120 applies a product matching model 328 and determines that "krasnystaw serek homogenizowany wnl pdl 1x0125" is the product appearing in the promotion.

Flowcharts representative of example hardware logic circuitry, machine readable instructions, hardware implemented state machines, and/or any combination thereof for implementing the leaflet coding system circuitry of FIGS. 1 and/or 3 is shown in FIGS. 5-9. The machine readable instructions may be one or more executable programs or portion(s) of an executable program for execution by processor circuitry, such as the processor circuitry 1012 shown in the example processor platform 1000 discussed below in connection with FIG. 10 and/or the example processor circuitry discussed below in connection with FIGS. 11 and/or 12. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIGS. 5-9, many other methods of implementing the example cross-coding pipeline circuitry 106 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 5-9 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 5:
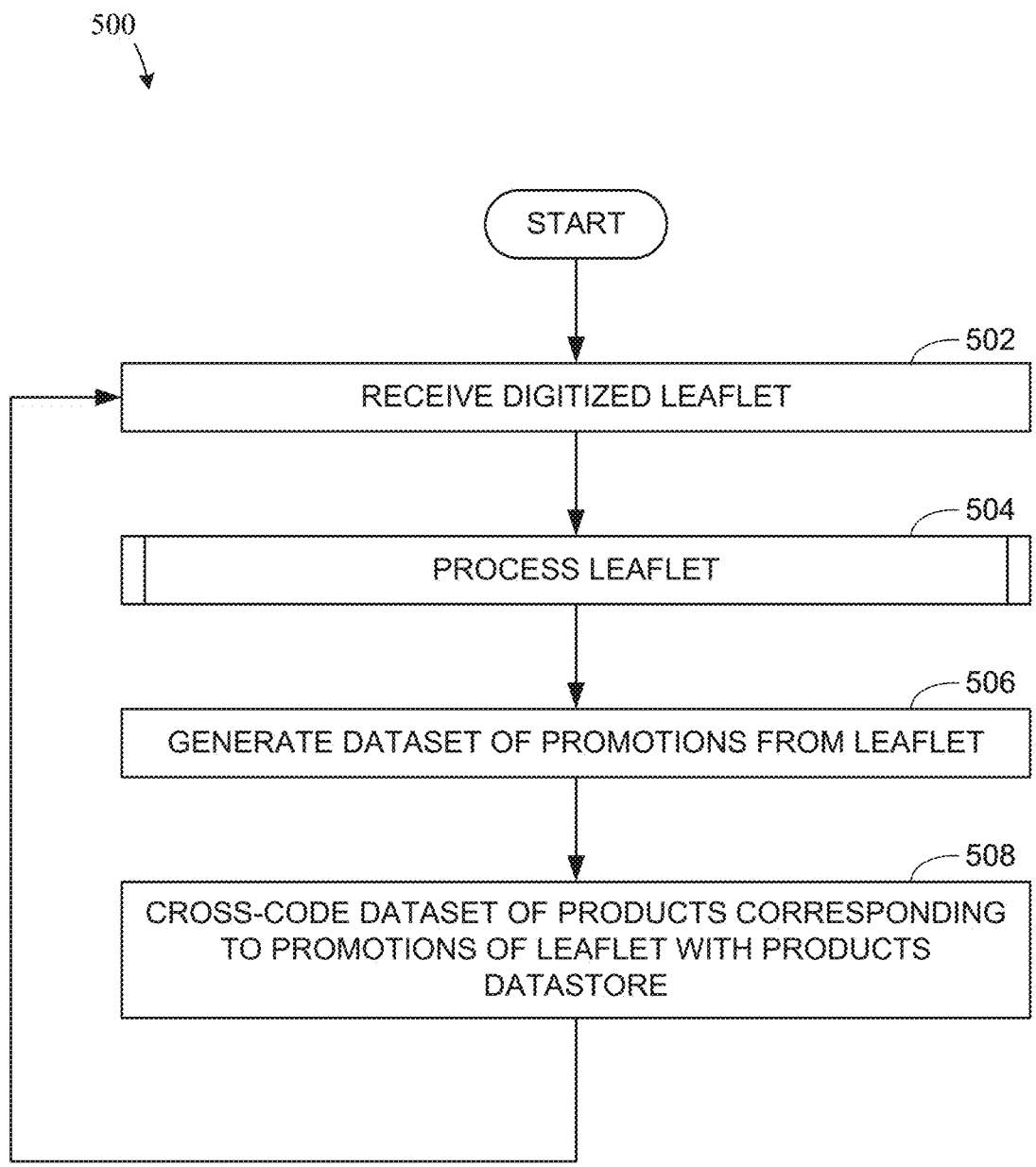
FIGS. 5-9 are flowcharts representative of example machine readable instructions that may be executed by example processor circuitry to implement the leaflet coding system circuitry of FIGS. 1 and/or 3.

FIG. 5 is a flowchart representative of example machine readable instructions and/or example operations 500 that may be executed and/or instantiated by processor circuitry to cross-code a digital leaflet (e.g., digital leaflet 102) with a product in a products datastore (e.g., products datastore 110). The machine readable instructions and/or operations 500 of FIG. 5 begin at block 502, at which the digital leaflet receiving circuitry 304 receives a digitized leaflet 102. For example, the digitized leaflet 102 may be a digital leaflet 102 sourced from a retailer's website, a digitized copy of a pamphlet from a brick-and-mortar store, etc. At block 504, the cross-coding pipeline circuitry 106 processes the digital leaflet 102. For example, the cross-coding pipeline circuitry 106 may match promotions appearing in the digital leaflet with corresponding candidates from a products datastore to enable cross coding between databases. At block 506, the cross-coding pipeline circuitry 106 generates a dataset of promotions from the digital leaflet 102, including the selected products from each promotion (e.g., promotion 108). That is, after the product matching circuitry 120 selects a product candidate for a promotion 108, the cross-coding pipeline circuitry 106 stores the selected product and associates it with the specific promotion 108. At block 508, the cross-coding pipeline circuitry 106 cross-codes the dataset of products corresponding to promotions of the digital leaflet 102 with the products datastore 110. For example, the cross-coding pipeline circuitry 106 may apply a mechanism within the dataset of products that instructs and/or provides a user with the product as it appears in the products datastore 110 and/or any other suitable datastore.

Figure 6:
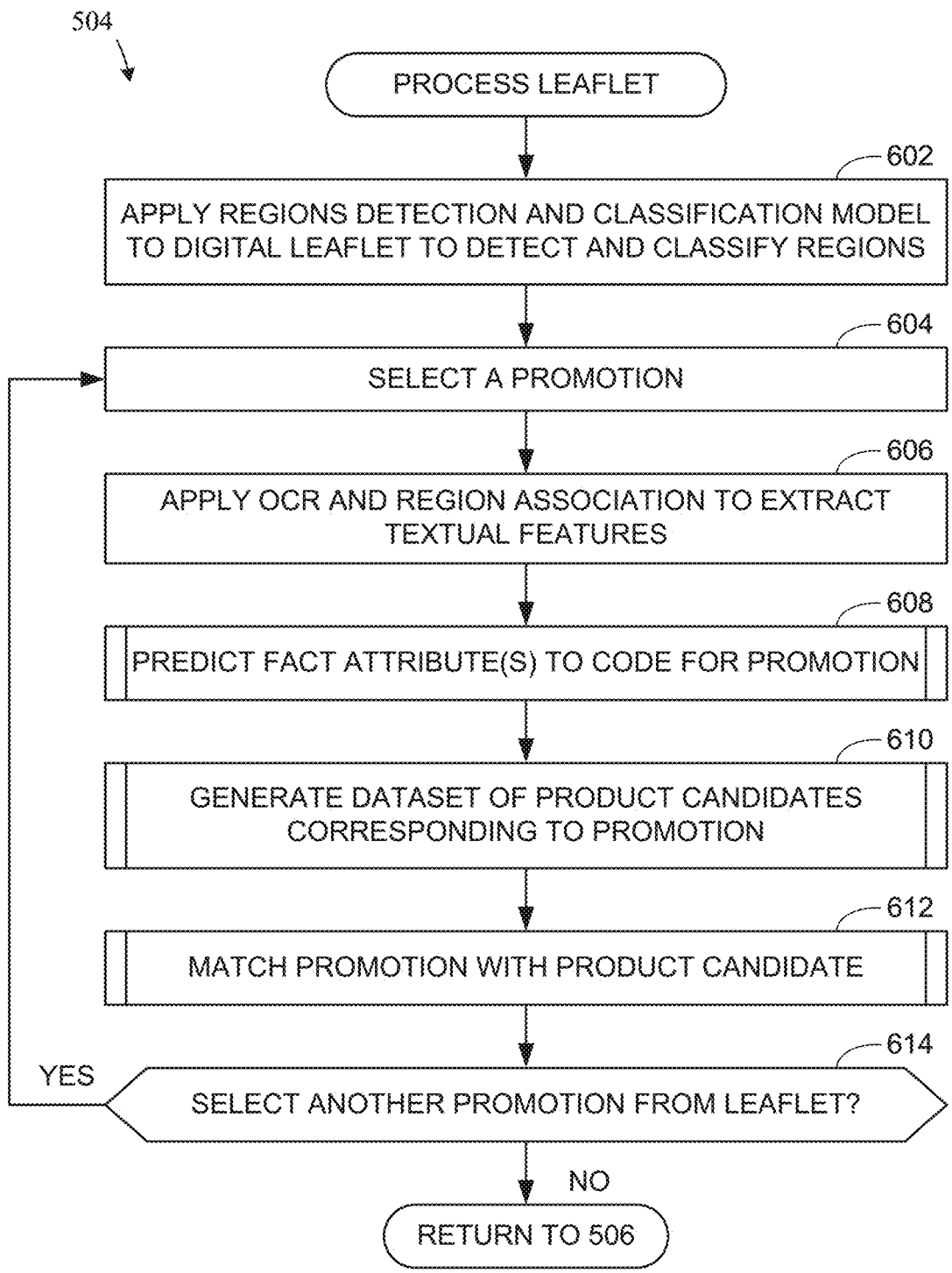

FIG. 6 is a flowchart representative of example machine readable instructions and/or example operations 504 that may be executed and/or instantiated by processor circuitry to process a digital leaflet 102. The machine readable instructions and/or operations 504 of FIG. 6 begin at block 602, at which the regions detection and classification circuitry 112 applies a regions detection and classification model 316 to the digital leaflet 102 to detect and classify regions of interest. For example, for a promotion 108 appearing in the digital leaflet 102, the regions detection and classification model 316 outputs a whole_promo region 126, a product_image 128, a description 130, and a price_promo 132. A promotion 108 includes the whole_promo region 126, which includes the product_image 128, description 130, and price_promo 132. At block 604, the cross-coding pipeline circuitry 106 selects a promotion 108 (e.g., whole_promo region 126) from the digital leaflet 102. At block 606, the text extraction circuitry 114 applies the OCR circuitry 310 and the textual field association circuitry 312 to the promotion 108 to extract textual features of the promotion 108. The OCR circuitry 310 extracts textual data from the previously detected regions of interest. Then, the textual field association circuitry 312 associates text from a detected region with that region to extract the textual features.

At block 608, the fact coding circuitry 116 predicts a fact attribute to code for the promotion 108. For example, the fact coding circuitry 116 may predict a fact value (e.g., promotion type) or a fact entity (e.g., BOGO), depending on a model applied. At block 610, the candidates determining circuitry 118 generates a dataset of product candidates corresponding to the promotion 108. For example, the candidate determining circuitry 118 predicts search attributes (e.g., product category, brand, etc.) which are then searched against the product's datastore 110 to generate a dataset of product candidates. At block 612, the product matching circuitry 120 matches a product candidate with the promotion 108. For example, the product matching circuitry 120 determines a match or mismatch determination for the ones of the dataset of product candidates. The product matching circuitry 120 ranks the product candidates and selects one product candidate to associate with the promotion 108. For example, the product matching circuitry 120 may select the highest ranked product candidate to associate with the promotion 108.

At block 614, the cross-coding pipeline circuitry 106 determines whether to select another promotion 108 from the digital leaflet. If a promotion 108 appearing in the digital leaflet 108 has not been processed, the answer to block 614 is YES. If the answer to block 614 is YES, the method goes back to block 604 where the cross-coding pipeline circuitry 106 selects another promotion 108 (e.g., whole_promo region 126) of the digital leaflet 102. If the promotion 108 appearing in the digital leaflet 102 have been associated with a product candidate, the answer to block 614 is NO. If the answer to block 614 is NO, control advances to block 506 of FIG. 5.

Figure 7:
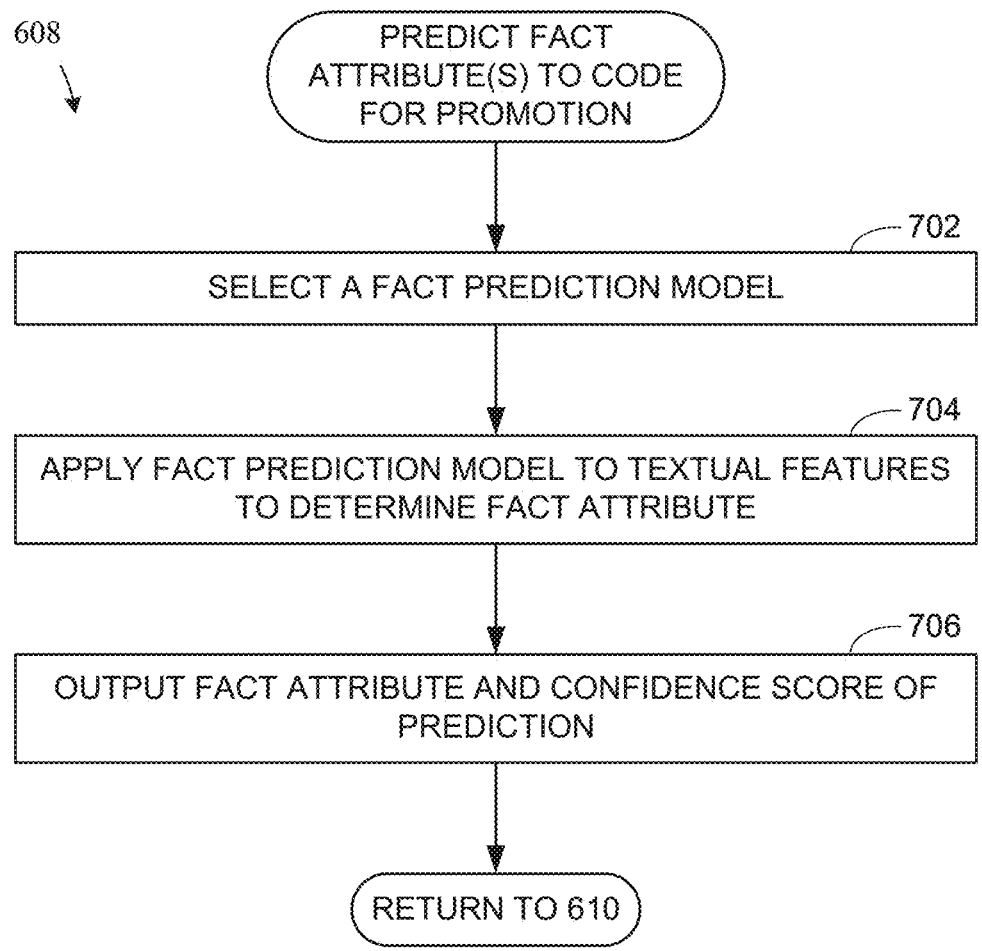

FIG. 7 is a flowchart representative of example machine readable instructions and/or example operations 608 that may be executed and/or instantiated by processor circuitry to predict a fact attribute(s) of the promotion 108. The machine readable instructions and/or operations 608 of FIG. 7 begin at block 702, at which the fact coding circuitry 116 selects a fact prediction model 316. For example, the fact coding circuitry 116 may select a fact prediction model 316 for a US digital leaflet 102 that predict a fact value. At block 704, the fact coding circuitry 116 applies the fact prediction model 316 to the extracted textual features to predict a fact attribute to code. For example, the fact prediction model 316 may predict a fact category (e.g., fact value) for a reduction type of the promotion 108. At block 704, the fact coding circuitry 116 outputs a fact attribute, such a fact value, and a confidence score of the prediction. Control then advances to block 610.

Figure 8:
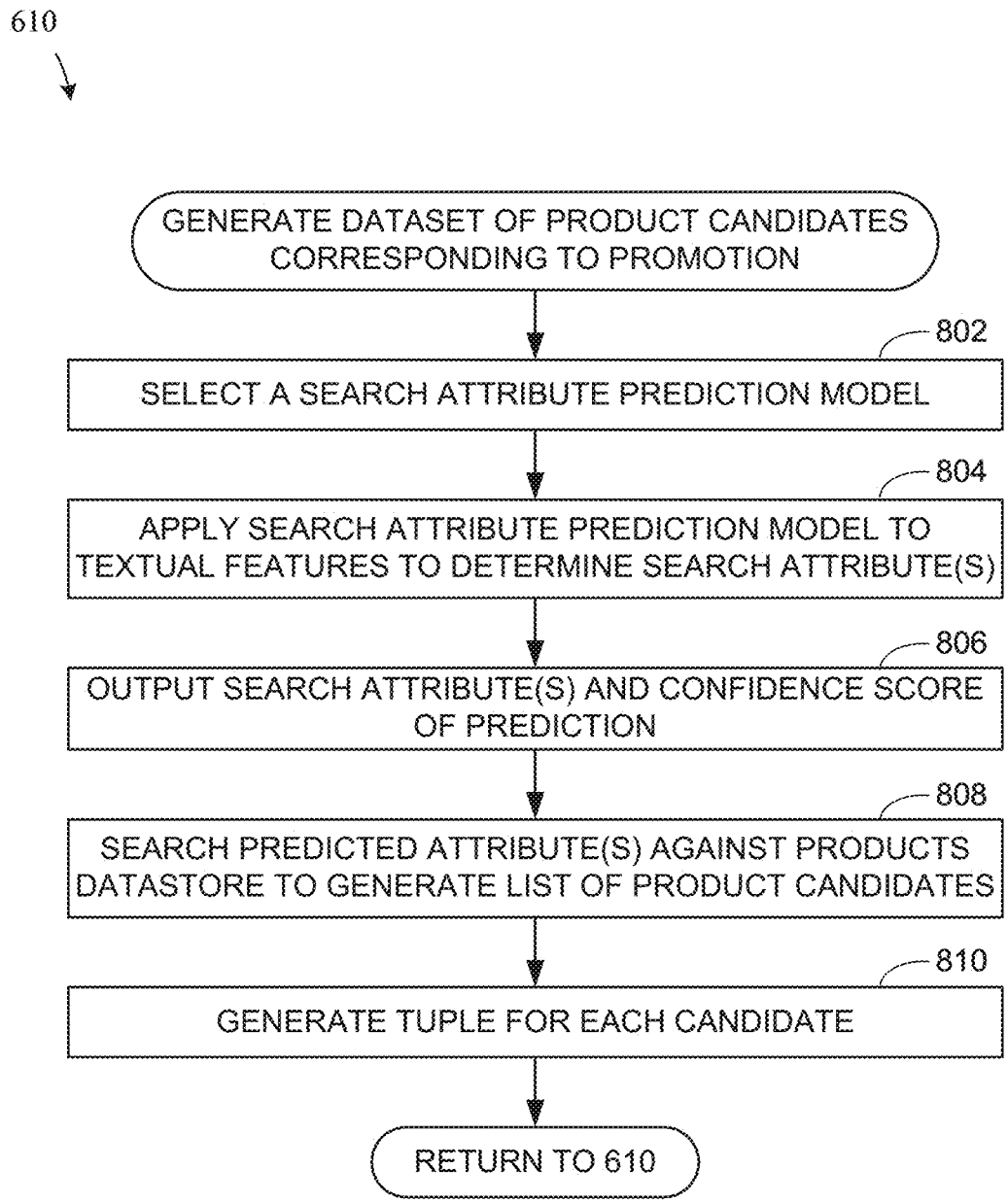

FIG. 8 is a flowchart representative of example machine readable instructions and/or example operations 610 that may be executed and/or instantiated by processor circuitry to generate a dataset of product candidates corresponding to the promotion 108. The machine readable instructions and/or operations 610 of FIG. 8 begin at block 802, at which the candidate determining circuitry 118 selects a search attribute prediction model (e.g., search attribute prediction model 320). For example, the candidate determining circuitry 118 may select a model for a US digital leaflet 102 that determines a search attribute value. At block 804, the candidate determining circuitry 118 applies the selected search attribute prediction model 320 to the textual features to determine search attributes. In some examples, the search attribute prediction model 320 determines one search attribute. In some example, the search attribute prediction model 320 determines multiple search attributes. For example, the search attribute prediction model 320 may predict a search attribute category (e.g., search attribute value) for a brand category, product class category, etc. At block 806, the search attribute prediction model 320 outputs a search attribute, such as a search attribute value, and a confidence score of the prediction. At block 808, the searching circuitry 324 searches the predicted search attribute(s) against the product datastore 110 to generate a dataset of product candidates. In some examples, the product candidate has a corresponding EAN associated with it. At block 810, the tuple generating circuitry 326 generates a tuple for the ones of the product candidate dataset. For example, a tuple of the dataset of product candidate tuples may include a search attribute, product brand, etc. Control then advances to block 612 of FIG. 6.

Figure 9:
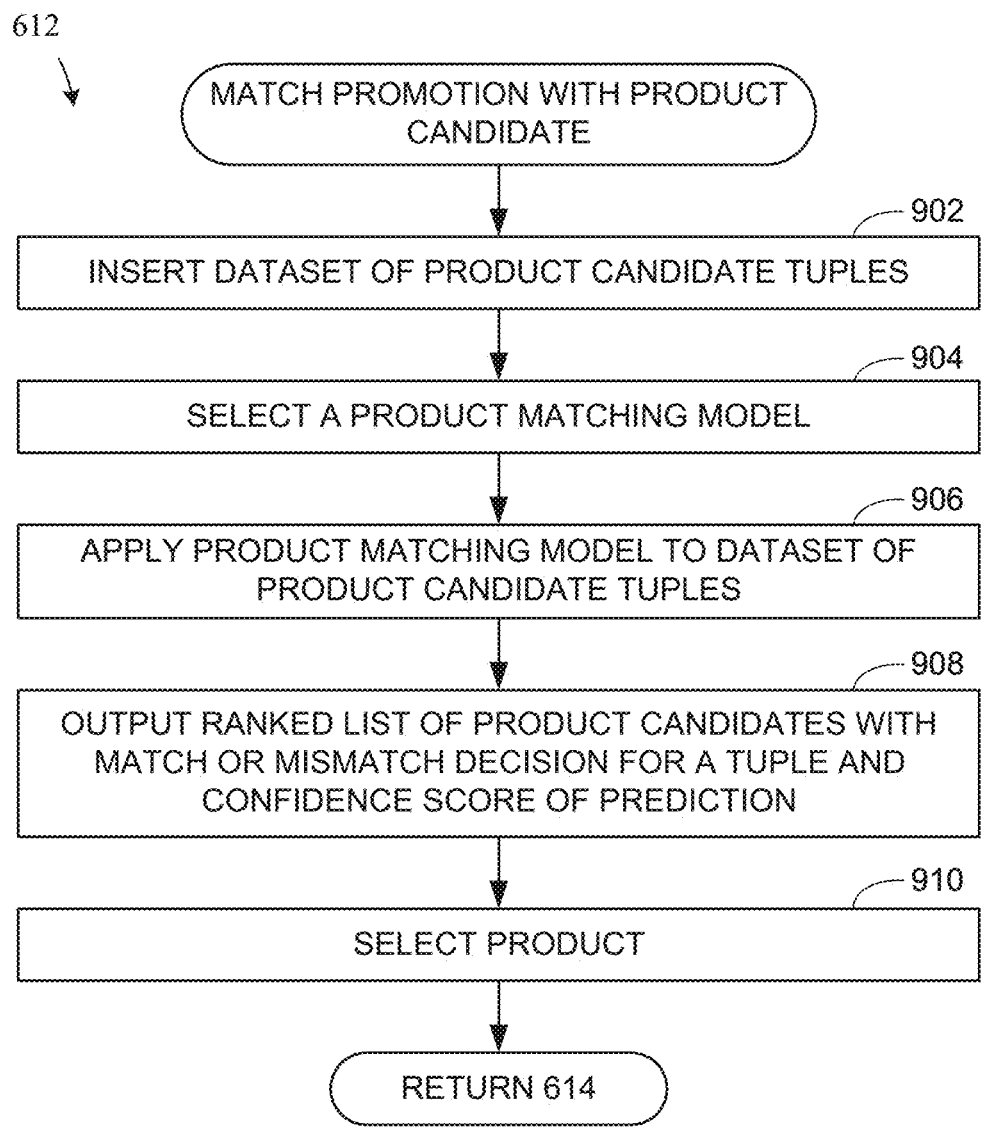

FIG. 9 is a flowchart representative of example machine readable instructions and/or example operations 612 that may be executed and/or instantiated by processor circuitry to match the promotion 108 with a product candidate. The machine readable instructions and/or operations 612 of FIG. 9 begin at block 902, at which the cross-coding pipeline circuitry 106 inputs the dataset of product candidate tuples in the product matching circuitry 120. At block 904, the product matching circuitry 120 selects a product matching model 328. For example, the product matching circuitry 120 may select a product matching model 328 corresponding to a digital leaflet 102 of the US. At block 906, the product matching circuitry 120 applies the product matching model 328 to the dataset of product candidate tuples.

At block 908, the product matching model 328 outputs a ranked list of the product candidate tuples, including a match or mismatch prediction for the ones of the dataset and a respective confidence score of the prediction. For example, the product matching model 328 goes through the dataset of product candidates tuples and predicts a match or mismatch for the ones of the dataset of product candidate tuples. The product matching model 328 may also include a confidence score of the match or mismatch decision for respective ones of the dataset of product candidate tuples. The list of product candidate tuples may be ranked by the level of confidence obtained in the confidence score. For example, product candidate tuples that receives a match decision would be at the top of the list while product candidate tuples may be at the bottom of the list. Within the matching product candidate tuples, the list may be ranked by the confidence score that was predict by the model.

At block 910, the product matching circuitry 120 selects a product from the ranked list of product candidate tuples to associate with the promotion 108. For example, the product matching circuitry 120 may select the highest ranked product candidate tuple as the product to associate with the promotion 108. Control then advances back to block 614 of FIG. 6.

Figure 10:
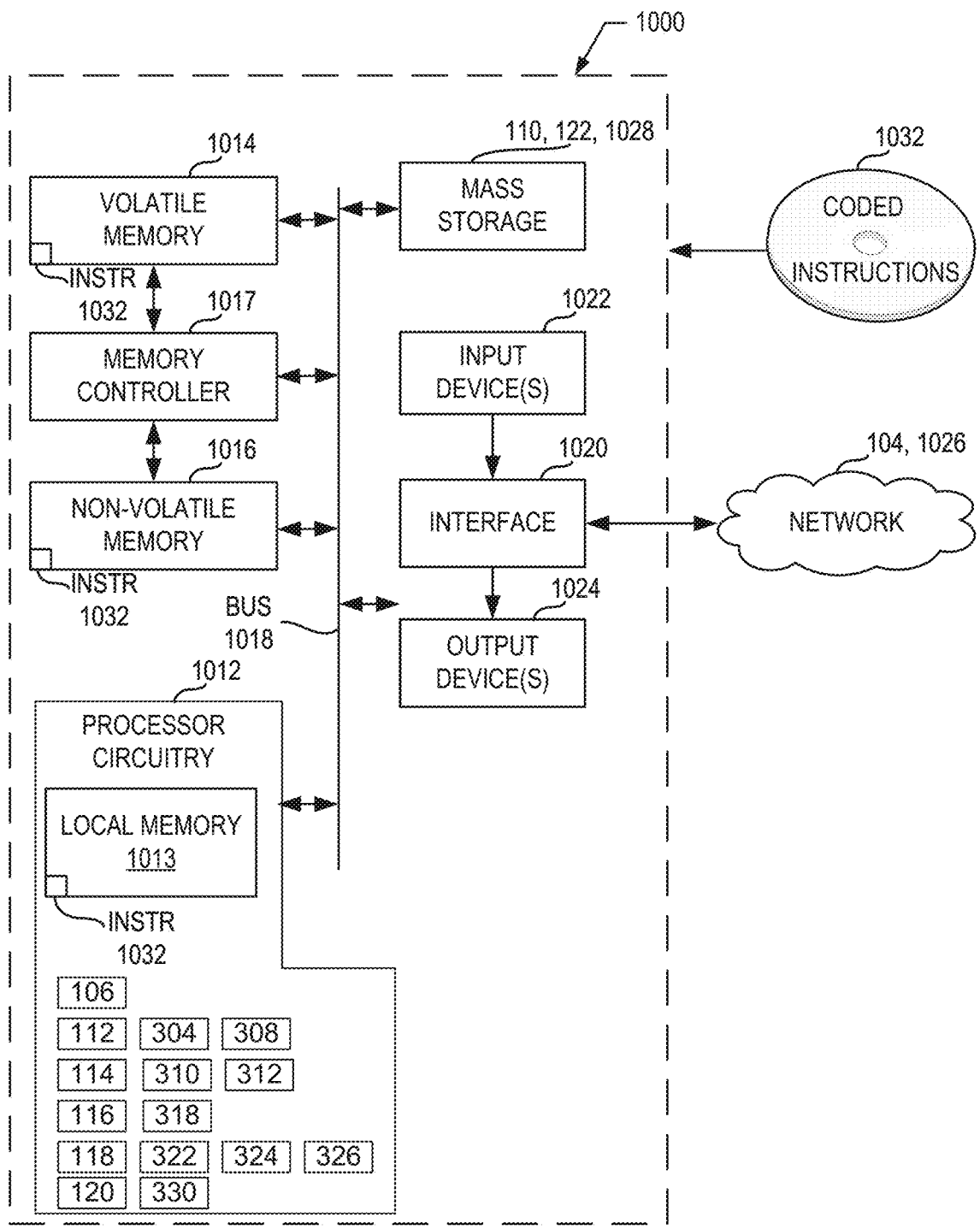
FIG. 10 is a block diagram of an example processing platform including processor circuitry structured to execute the example machine readable instructions of FIGS. 5-9 to implement the cross-coding system.

FIG. 10 is a block diagram of an example processor platform 1000 structured to execute and/or instantiate the machine readable instructions and/or operations of FIGS. 4-8 to implement the example cross-coding pipeline circuitry 106 of FIG. 1 and FIG. 3. The processor platform 1000 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1000 of the illustrated example includes processor circuitry 1012. The processor circuitry 1012 of the illustrated example is hardware. For example, the processor circuitry 1012 can be implemented by one or more integrated circuits, logic circuits, FPGAs microprocessors, CPUs, GPUs, DSPs, and/or microcontrollers from any desired family or manufacturer. The processor circuitry 1012 may be implemented by one or more semiconductor based (e.g., silicon based) devices. In this example, the processor circuitry 1012 implements the example regions detection and classification circuitry 112, the example digital leaflet receiving circuitry 304, the example region detection and classification model 306, the example regions detection and classification model training circuitry 308, the example text extraction circuitry 114, the example OCR circuitry 310, the example textual field associated circuitry 312, the example fact coding circuitry 116, the example fact prediction model 316, the example fact prediction model training circuitry 318, the example candidate determining circuitry 118, the example search attribute prediction model 320, the example searching circuitry 324, the example tuple generating circuitry 326, the example product matching circuitry 120, the example product matching model 328, and the example product matching model training circuitry 330.

The processor circuitry 1012 of the illustrated example includes a local memory 1013 (e.g., a cache, registers, etc.). The processor circuitry 1012 of the illustrated example is in communication with a main memory including a volatile memory 1014 and a non-volatile memory 1016 by a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller 1017.

The processor platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1022 are connected to the interface circuitry 1020. The input device(s) 1022 permit(s) a user to enter data and/or commands into the processor circuitry 1012. The input device(s) 1022 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1024 are also connected to the interface circuitry 1020 of the illustrated example. The output devices 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1000 of the illustrated example also includes one or more mass storage devices 1028 to store software and/or data. Examples of such mass storage devices 1028 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1032, which may be implemented by the machine readable instructions of FIGS. 5-9, may be stored in the mass storage device 1028, in the volatile memory 1014, in the non-volatile memory 1016, and/or on a removable non-transitory computer readable storage medium such as a CD or DVD.

Figure 11:
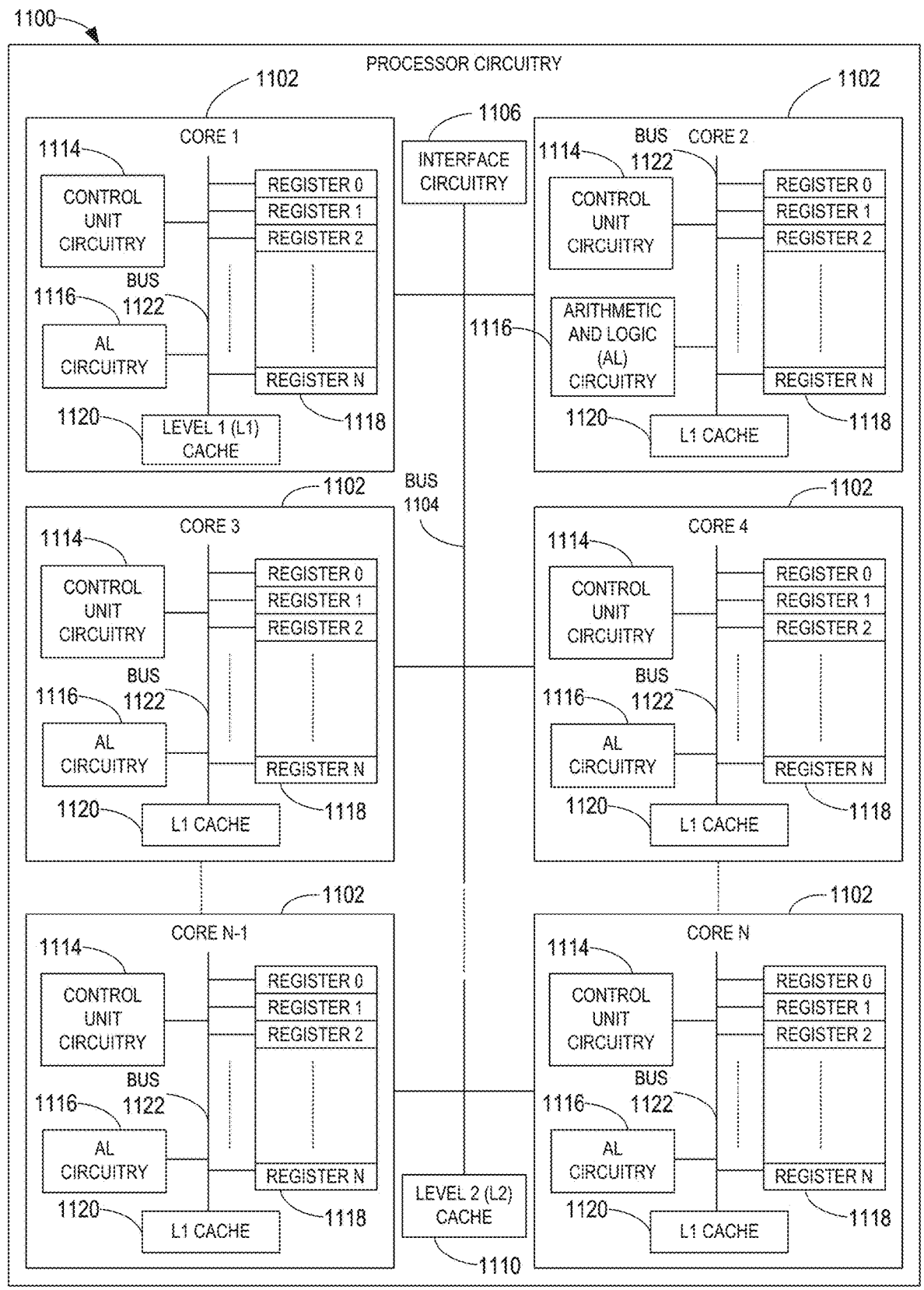
FIG. 11 is a block diagram of an example implementation of the processor circuitry of FIG. 10.

FIG. 11 is a block diagram of an example implementation of the processor circuitry 1012 of FIG. 10. In this example, the processor circuitry 1012 of FIG. 10 is implemented by a microprocessor 1100. For example, the microprocessor 1100 may implement multi-core hardware circuitry such as a CPU, a DSP, a GPU, an XPU, etc. Although it may include any number of example cores 1102 (e.g., 1 core), the microprocessor 1100 of this example is a multi-core semiconductor device including N cores. The cores 1102 of the microprocessor 1100 may operate independently or may cooperate to execute machine readable instructions. For example, machine code corresponding to a firmware program, an embedded software program, or a software program may be executed by one of the cores 1102 or may be executed by multiple ones of the cores 1102 at the same or different times. In some examples, the machine code corresponding to the firmware program, the embedded software program, or the software program is split into threads and executed in parallel by two or more of the cores 1102. The software program may correspond to a portion or all of the machine readable instructions and/or operations represented by the flowchart of FIGS. 5-9.

The cores 1102 may communicate by an example bus 1104. In some examples, the bus 1104 may implement a communication bus to effectuate communication associated with one(s) of the cores 1102. For example, the bus 1104 may implement at least one of an Inter-Integrated Circuit (I2C) bus, a Serial Peripheral Interface (SPI) bus, a PCI bus, or a PCIe bus. Additionally or alternatively, the bus 1104 may implement any other type of computing or electrical bus. The cores 1102 may obtain data, instructions, and/or signals from one or more external devices by example interface circuitry 1106. The cores 1102 may output data, instructions, and/or signals to the one or more external devices by the interface circuitry 1111. Although the cores 1102 of this example include example local memory 1120 (e.g., Level 1 (L1) cache that may be split into an L1 data cache and an L1 instruction cache), the microprocessor 1100 also includes example shared memory 1110 that may be shared by the cores (e.g., Level 2 (L2_ cache)) for high-speed access to data and/or instructions. Data and/or instructions may be transferred (e.g., shared) by writing to and/or reading from the shared memory 1110. The local memory 1120 of each of the cores 1102 and the shared memory 1110 may be part of a hierarchy of storage devices including multiple levels of cache memory and the main memory (e.g., the main memory 1014, 1016 of FIG. 10). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1102 may be referred to as a CPU, DSP, GPU, etc., or any other type of hardware circuitry. Each core 1102 includes control unit circuitry 1114, arithmetic and logic (AL) circuitry (sometimes referred to as an ALU) 1116, a plurality of registers 1118, the L1 cache 1120, and an example bus 1122. Other structures may be present. For example, each core 1102 may include vector unit circuitry, single instruction multiple data (SIMD) unit circuitry, load/store unit (LSU) circuitry, branch/jump unit circuitry, floating-point unit (FPU) circuitry, etc. The control unit circuitry 1114 includes semiconductor-based circuits structured to control (e.g., coordinate) data movement within the corresponding core 1102. The AL circuitry 1116 includes semiconductor-based circuits structured to perform one or more mathematic and/or logic operations on the data within the corresponding core 1102. The AL circuitry 1116 of some examples performs integer based operations. In other examples, the AL circuitry 1116 also performs floating point operations. In yet other examples, the AL circuitry 1116 may include first AL circuitry that performs integer based operations and second AL circuitry that performs floating point operations. In some examples, the AL circuitry 1116 may be referred to as an Arithmetic Logic Unit (ALU). The registers 1118 are semiconductor-based structures to store data and/or instructions such as results of one or more of the operations performed by the AL circuitry 1116 of the corresponding core 1102. For example, the registers 1118 may include vector register(s), SIMD register(s), general purpose register(s), flag register(s), segment register(s), machine specific register(s), instruction pointer register(s), control register(s), debug register(s), memory management register(s), machine check register(s), etc. The registers 1118 may be arranged in a bank as shown in FIG. 5. Alternatively, the registers 1118 may be organized in any other arrangement, format, or structure including distributed throughout the core 1102 to shorten access time. The bus 1120 may implement at least one of an I2C bus, a SPI bus, a PCI bus, or a PCIe bus Each core 1102 and/or, more generally, the microprocessor 1100 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1100 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 12:
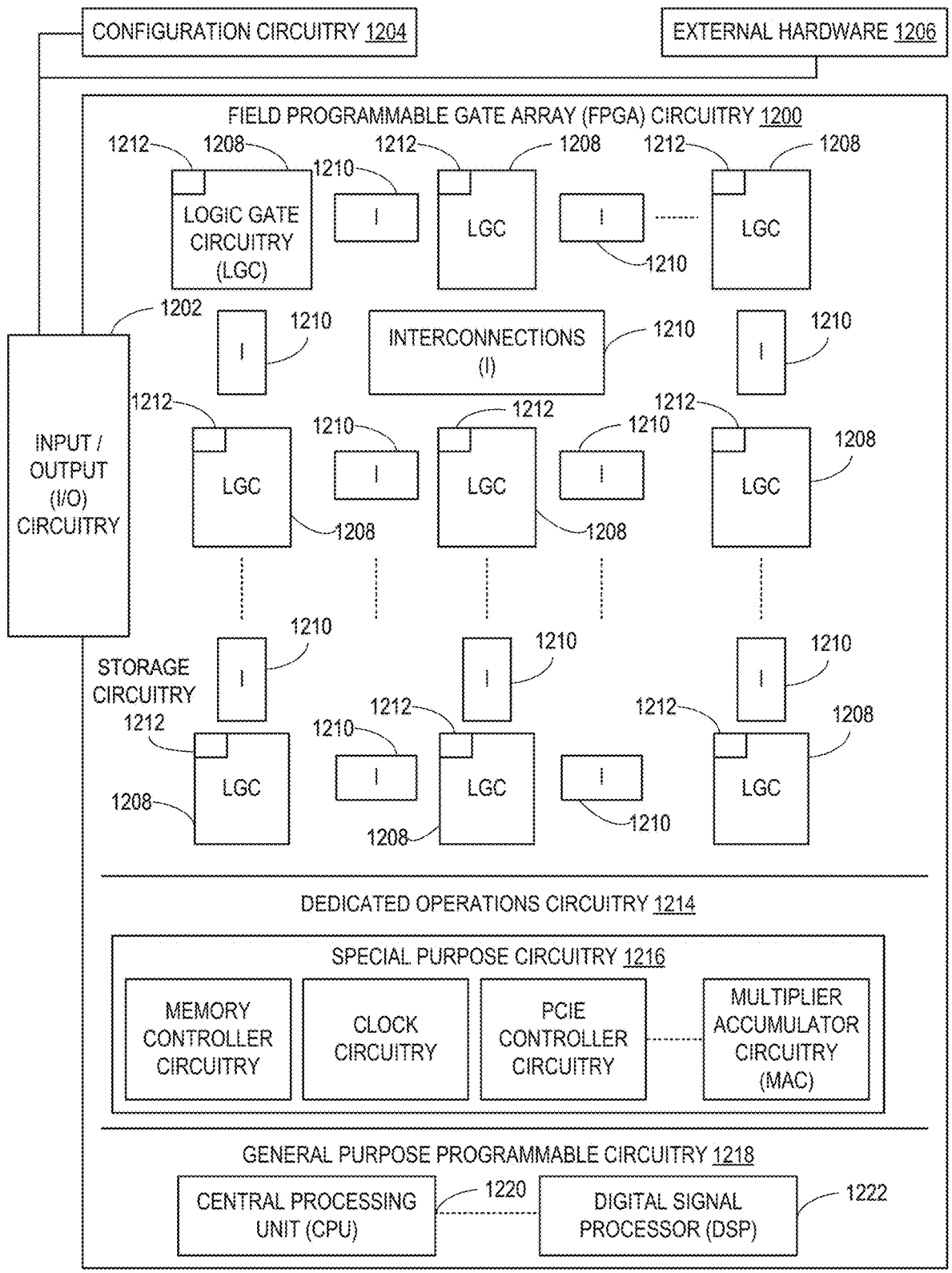
FIG. 12 is a block diagram of another example implementation of the processor circuitry of FIG. 10.

FIG. 12 is a block diagram of another example implementation of the processor circuitry 1012 of FIG. 10. In this example, the processor circuitry 1012 is implemented by FPGA circuitry 1200. The FPGA circuitry 1200 can be used, for example, to perform operations that could otherwise be performed by the example microprocessor 1100 of FIG. 11 executing corresponding machine readable instructions. However, once configured, the FPGA circuitry 1200 instantiates the machine readable instructions in hardware and, thus, can often execute the operations faster than they could be performed by a general purpose microprocessor executing the corresponding software.

More specifically, in contrast to the microprocessor 1100 of FIG. 11 described above (which is a general purpose device that may be programmed to execute some or all of the machine readable instructions represented by the flowchart of FIGS. 5-9 but whose interconnections and logic circuitry are fixed once fabricated), the FPGA circuitry 1200 of the example of FIG. 12 includes interconnections and logic circuitry that may be configured and/or interconnected in different ways after fabrication to instantiate, for example, some or all of the machine readable instructions represented by the flowchart of FIGS. 5-9 In particular, the FPGA 1200 may be thought of as an array of logic gates, interconnections, and switches. The switches can be programmed to change how the logic gates are interconnected by the interconnections, effectively forming one or more dedicated logic circuits (unless and until the FPGA circuitry 1200 is reprogrammed). The configured logic circuits enable the logic gates to cooperate in different ways to perform different operations on data received by input circuitry. Those operations may correspond to some or all of the software represented by the flowchart of FIGS. 5-9 As such, the FPGA circuitry 1200 may be structured to effectively instantiate some or all of the machine readable instructions of the flowchart of FIGS. 5-9 as dedicated logic circuits to perform the operations corresponding to those software instructions in a dedicated manner analogous to an ASIC. Therefore, the FPGA circuitry 1200 may perform the operations corresponding to the some or all of the machine readable instructions of FIGS. 5-9 faster than the general purpose microprocessor can execute the same.

In the example of FIG. 12, the FPGA circuitry 1200 is structured to be programmed (and/or reprogrammed one or more times) by an end user by a hardware description language (HDL) such as Verilog. The FPGA circuitry 1200 of FIG. 12, includes example input/output (I/O) circuitry 1202 to obtain and/or output data to/from example configuration circuitry 1204 and/or external hardware (e.g., external hardware circuitry) 1206. For example, the configuration circuitry 1204 may implement interface circuitry that may obtain machine readable instructions to configure the FPGA circuitry 1200, or portion(s) thereof. In some such examples, the configuration circuitry 1204 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1206 may implement the microprocessor 1100 of FIG. 11. The FPGA circuitry 1200 also includes an array of example logic gate circuitry 1208, a plurality of example configurable interconnections 1210, and example storage circuitry 1212. The logic gate circuitry 1208 and interconnections 1210 are configurable to instantiate one or more operations that may correspond to at least some of the machine readable instructions of FIGS. 5-9 and/or other desired operations. The logic gate circuitry 1208 shown in FIG. 12 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1208 to enable configuration of the electrical structures and/or the logic gates to form circuits to perform desired operations. The logic gate circuitry 1208 may include other electrical structures such as look-up tables (LUTs), registers (e.g., flip-flops or latches), multiplexers, etc.

The interconnections 1210 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1208 to program desired logic circuits.

The storage circuitry 1212 of the illustrated example is structured to store result(s) of the one or more of the operations performed by corresponding logic gates. The storage circuitry 1212 may be implemented by registers or the like. In the illustrated example, the storage circuitry 1212 is distributed amongst the logic gate circuitry 1208 to facilitate access and increase execution speed.

The example FPGA circuitry 1200 of FIG. 12 also includes example Dedicated Operations Circuitry 1214. In this example, the Dedicated Operations Circuitry 1214 includes special purpose circuitry 1216 that may be invoked to implement commonly used functions to avoid the need to program those functions in the field. Examples of such special purpose circuitry 1216 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1200 may also include example general purpose programmable circuitry 1218 such as an example CPU 1220 and/or an example DSP 1222. Other general purpose programmable circuitry 1218 may additionally or alternatively be present such as a GPU, an XPU, etc., that can be programmed to perform other operations.

Although FIGS. 11 and 12 illustrate two example implementations of the processor circuitry 1012 of FIG. 10, many other approaches are contemplated. For example, as mentioned above, modern FPGA circuitry may include an on-board CPU, such as one or more of the example CPU 1220 of FIG. 12. Therefore, the processor circuitry 1012 of FIG. 10 may additionally be implemented by combining the example microprocessor 1100 of FIG. 11 and the example FPGA circuitry 1200 of FIG. 12. In some such hybrid examples, a first portion of the machine readable instructions represented by the flowchart of FIGS. 5-9 may be executed by one or more of the cores 1102 of FIG. 1 and a second portion of the machine readable instructions represented by the flowchart of FIGS. 5-9 may be executed by the FPGA circuitry 1200 of FIG. 12.

In some examples, the processor circuitry 1012 of FIG. 10 may be in one or more packages. For example, the processor circuitry 1100 of FIG. 1 and/or the FPGA circuitry 1200 of FIG. 12 may be in one or more packages. In some examples, an XPU may be implemented by the processor circuitry 1012 of FIG. 10, which may be in one or more packages. For example, the XPU may include a CPU in one package, a DSP in another package, a GPU in yet another package, and an FPGA in still yet another package.

Figure 13:
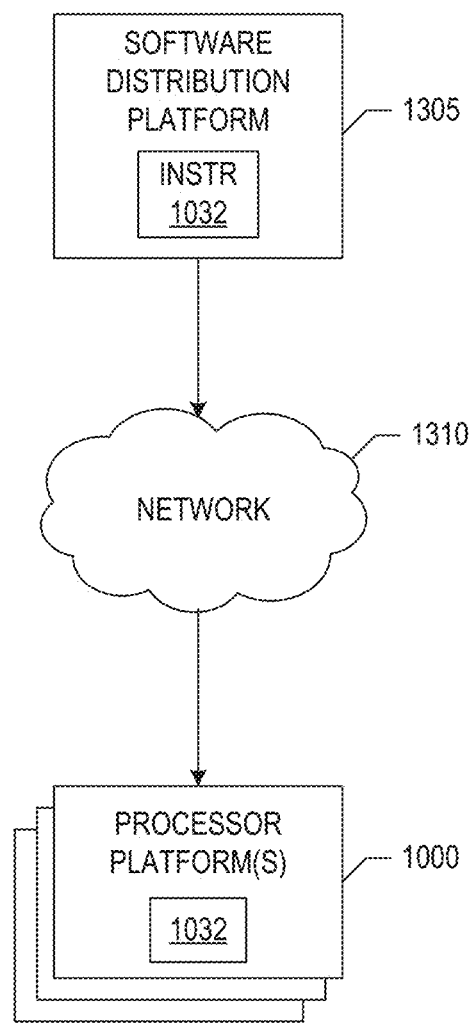
FIG. 13 is a block diagram of an example software distribution platform (e.g., one or more servers) to distribute software (e.g., software corresponding to the example machine readable instructions of FIGS. 5-9) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1305 to distribute software such as the example machine readable instructions 1032 of FIG. 10 to hardware devices owned and/or operated by third parties is illustrated in FIG. 13. The example software distribution platform 1305 may be implemented by any computer server, data facility, cloud service, etc., capable of storing and transmitting software to other computing devices. The third parties may be customers of the entity owning and/or operating the software distribution platform 1305. For example, the entity that owns and/or operates the software distribution platform 1305 may be a developer, a seller, and/or a licensor of software such as the example machine readable instructions 1032 of FIG. 10. The third parties may be consumers, users, retailers, OEMs, etc., who purchase and/or license the software for use and/or re-sale and/or sub-licensing. In the illustrated example, the software distribution platform 1305 includes one or more servers and one or more storage devices. The storage devices store the machine readable instructions 1032, which may correspond to the example machine readable instructions of FIGS. 5-9, as described above. The one or more servers of the example software distribution platform 1305 are in communication with a network 1310, which may correspond to any one or more of the Internet and/or any of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1032 from the software distribution platform 1305. For example, the software, which may correspond to the example machine readable instructions of FIGS. 5-9 may be downloaded to the example processor platform 1000, which is to execute the machine readable instructions 1032 to implement the cross-coding pipeline circuitry 106. In some example, one or more servers of the software distribution platform 1305 periodically offer, transmit, and/or force updates to the software (e.g., the example machine readable instructions 1332 of FIG. 13) to ensure improvements, patches, updates, etc., are distributed and applied to the software at the end user devices.

From the foregoing, it will be appreciated that example systems, methods, apparatus, and articles of manufacture have been disclosed that cross-code digital leaflet having promotions. The disclosed systems, methods, apparatus, and articles of manufacture improve the efficiency of using a computing device by applying CV and NLP to a digital leaflet processing pipeline to improve automation. The disclosed systems, method, apparatus, and articles of manufacture include a novel cross-coding pipeline solution to cross-coding in digital leaflets that increases the productivity of the leaflet cross-coding process thereby enabling a company to cross-code a larger amount of digital leaflets than would otherwise be feasible The disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to categorize image text are disclosed herein. Further examples and combinations thereof include the following:

Example 1 includes an apparatus comprising at least one memory, instructions in the apparatus, and processor circuitry to execute the instructions to detect regions of interest corresponding to a product promotion of an input digital leaflet, extract textual features from the product promotion by applying an optical character recognition (OCR) algorithm to the product promotion and associating output text data with corresponding ones of the regions of interest, determine a search attribute corresponding to the product promotion, generate a first dataset of candidate products corresponding to the product in the product promotion by comparing the search attribute against a second dataset of products, and select a product from the first dataset of candidate products to associate with the product promotion, the product selected based on a match determination.

Example 2 includes the apparatus of example 1, wherein detecting the regions of interest includes classifying the regions of interest, the processor circuitry to execute the instructions to detect the regions of interest by applying a trained model based on a R-CNN architecture to the product promotion.

Example 3 includes the apparatus of any of examples 1-2, wherein the regions of interest include a whole promotion region, a product image region, a description region, and a price promotion region.

Example 4 includes the apparatus of any of examples 1-3, wherein the search attribute is a categorical value including at least one of product brand, product category, or product class.

Example 5 includes the apparatus of any of examples 1-4, where the search attribute includes a calculated confidence score.

Example 6 includes the apparatus of any of examples 1-5, wherein the processor circuitry is to execute the instructions to determine a fact attribute corresponding to the product promotion and associate the fact attribute with the product promotion.

Example 7 includes the apparatus of any of examples 1-6, wherein at least one of the search attribute or target attribute are determined by applying a natural language processing (NLP) based model to the extracted textual features.

Example 8 includes the apparatus of any of examples 6-7, wherein the fact attribute is a categorical attribute including at least one of promotion type, reduction type, price, quantity, or discount.

Example 9 includes the apparatus of any of examples 6-8, wherein the fact attribute includes a calculated confidence score.

Example 10 includes the apparatus of any of examples 1-9, wherein the processor circuitry is to execute the instructions to determine a match or a mismatch value for ones of the first dataset of candidate products, the match or mismatch value to include a calculated confidence score.

Example 11 includes the apparatus of any of examples 1-10, wherein the processor circuitry is to execute the instructions to rank the ones of the first dataset of candidate products that received the match value, the ranking based on the respective confidence scores.

Example 12 includes the apparatus of any of examples 1-11, wherein the processor circuitry is to execute the instructions to select the product from the first dataset corresponding to the highest ranked candidate product of the ones of the first dataset of candidate products that received the match value.

Example 13 includes the apparatus of any of examples 1-12, wherein the digital leaflet includes two or more product promotions, the processor circuitry to execute the instructions to associate a respective product for respective ones of the product promotions within the digital leaflet.

Example 14 includes at least one non-transitory computer readable medium comprising instructions that, when executed, cause at least one processor to at least identify regions of interest corresponding to a product promotion of an input digital leaflet, extract textual features from the product promotion by applying an optical character recognition (OCR) algorithm to the product promotion and linking output textual data with corresponding ones of the regions of interest, identify a search attribute corresponding to the product promotion, evaluate the search attribute against a second dataset of products to generate a first dataset of candidate products corresponding to the product in the product promotion, and select a product from the first dataset of candidate products to associate with the product promotion, the product selected based on a match assessment.

Example 15 includes the at least one non-transitory computer readable medium of example 14, wherein identifying the regions of interest further includes categorizing the regions of interest, the instructions, when executed, to cause the at least one processor to identify the regions of interest by applying a trained R-CNN based model to the product promotion.

Example 16 includes the at least one non-transitory computer readable medium of any of examples 14-15, wherein the regions of interest include a whole promotion region, a product image region, a description region, and a price promotion region.

Example 17 includes the at least one non-transitory computer readable medium of any of examples 14-16, wherein the search attribute is a categorical value including at least one of product brand, product category, or product class.

Example 18 includes the at least one non-transitory computer readable medium of any of examples 14-17, wherein the search attribute includes a calculated confidence score.

Example 19 includes the at least one non-transitory computer readable medium of any of examples 14-18, where the instructions, when executed, to cause the at least one processor to determine a fact attribute corresponding to the product promotion and associate the fact attribute with the product promotion.

Example 20 includes the at least one non-transitory computer readable medium of any of examples 14-19, wherein at least one of the search attribute or target attribute are determined by applying a natural language processing (NLP) based model to the extracted textual features.

Example 21 includes the at least one non-transitory computer readable medium of any of examples 19-20, wherein the fact attribute is a categorical attribute including at least one of promotion type, reduction type, price, quantity, or discount.

Example 22 includes the at least one non-transitory computer readable medium of any of examples 19-21, wherein the fact attribute includes a calculated confidence score.

Example 23 includes the at least one non-transitory computer readable medium of any of examples 14-22, wherein the instructions, when executed, to cause the at least one processor to determine a match or a mismatch value for ones of the first dataset of candidate products, the match or mismatch value to include a calculated confidence score.

Example 24 includes the at least one non-transitory computer readable medium of any of examples 14-23, wherein the instructions, when executed, to cause the at least one processor to rank the ones of the first dataset of candidate products that received the match value, the ranking based on the respective confidence scores.

Example 25 includes the at least one non-transitory computer readable medium of any of examples 14-24, wherein the instructions, when executed, to cause the at least one processor to select the product from the first dataset corresponding to the highest ranked candidate product of the ones of the first dataset of candidate products that received the match value.

Example 26 includes the at least one non-transitory computer readable medium of any of examples 14-25, wherein the digital leaflet includes two or more product promotions, the instructions, when executed, to cause the at least one processor to associate a respective product for respective ones of the product promotions within the digital leaflet.

Example 27 includes a method comprising detecting, by executing an instruction with at least one processor, regions of interest corresponding to a product promotion of an input digital leaflet, extracting, by executing instructions with at least one processor, textual features from the product promotion by applying an optical character recognition (OCR) algorithm to the product promotion and associating output text data with corresponding ones of the regions of interest, determining, by executing an instruction with at least one processor, a search attribute corresponding to the product promotion, generating, by executing an instruction with at least one processor, a first dataset of candidate products corresponding to the product in the product promotion by comparing the search attribute against a second dataset of products, and selecting a product from the first dataset of candidate products to associate with the product promotion, the product selected based on a match determination.

Example 28 includes the method of example 27, wherein the detecting of the regions of interest includes applying a trained model based on a R-CNN architecture to the product promotion, and wherein the detecting of the regions of interest includes classifying the regions of interest.

Example 29 includes the method of any of examples 27-28, wherein the regions of interest include a whole promotion region, a product image region, a description region, and a price promotion region.

Example 30 includes the method of any of examples 27-29, wherein the search attribute is a categorical value including at least one of product brand, product category, or product class.

Example 31 includes the method of any of examples 27-30, wherein the search attribute includes a calculated confidence score.

Example 32 includes the method of any of examples 27-31, further including determine a fact attribute corresponding to the product promotion and associating the fact attribute with the product promotion.

Example 33 includes the method of any of examples 27-32, wherein at least one of the search attribute or target attribute are determined by applying a natural language processing (NLP) based model to the extracted textual features.

Example 34 includes the method of any of examples 32-33, wherein the fact attribute is a categorical attribute including at least one of promotion type, reduction type, price, quantity, or discount.

Example 35 includes the method of any of examples 32-34, wherein the fact attribute includes a calculated confidence score.

Example 36 includes the method of any of examples 27-35, further including determining a match or a mismatch value for ones of the first dataset of candidate products, the match or mismatch value including a confidence score.

Example 37 includes the method of any of examples 27-36, further including ranking the ones of the first dataset of candidate products that received the match value, the ranking based on the respective confidence scores.

Example 38 includes the method of any of examples 27-37, wherein the selecting of the product includes selecting the product from the first dataset corresponding to the highest ranked candidate product of the ones of the first dataset of candidate products that received the match value.

Example 39 includes the method of any of examples 27-38, wherein the digital leaflet includes two or more product promotions, the method further including associating a respective product for respective ones of the product promotions within the digital leaflet.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
    interface circuitry;
    machine-readable instructions; and
    at least one processor circuit to be programmed by the machine-readable instructions to:
        determine a geographic area associated with an input digital leaflet based on metadata extracted from the input digital leaflet;
        detect regions of the input digital leaflet corresponding to a product promotion, the regions based on the geographic area;
        extract textual features from the regions corresponding to the product promotion by applying an optical character recognition (OCR) algorithm to the product promotion and associating output text data with respective ones of the regions;
        determine a search attribute corresponding to a product represented in the product promotion, the search attribute based on the geographic area;
        generate a first dataset of candidate products corresponding to the product in the product promotion by comparing the search attribute against a second dataset of products, the second dataset specific to the geographic area; and
        select a candidate product from the first dataset of candidate products to associate with the product promotion, the candidate product selected based on a match determination.

2. The apparatus of claim 1, wherein detecting the regions of the input digital leaflet includes classifying the regions of the input digital leaflet, and one or more of the at least one processor circuit is to detect the regions of the input digital leaflet by applying a trained model based on a region-based convolutional neural network (R-CNN) architecture to the product promotion.

3. The apparatus of claim 1, wherein the regions of the input digital leaflet include a whole promotion region, a product image region, a description region, and a price promotion region.

4. The apparatus of claim 1, wherein the search attribute is a categorical value including at least one of product brand, product category, or product class.

5. The apparatus of claim 1, wherein one or more of the at least one processor circuit is to determine a fact attribute corresponding to the product promotion and associate the fact attribute with the product promotion.

6. The apparatus of claim 5, wherein at least one of the search attribute or target attribute are determined by applying a natural language processing (NLP) based model to the extracted textual features.

7. The apparatus of claim 5, wherein the fact attribute is a categorical attribute including at least one of promotion type, reduction type, price, quantity, or discount.

8. The apparatus of claim 1, wherein one or more of the at least one processor circuit is to determine a match value or a mismatch value for ones of the first dataset of candidate products, the match value or the mismatch value to include a calculated confidence score.

9. The apparatus of claim 8, wherein one or more of the at least one processor circuit is to rank the ones of the first dataset of candidate products that received the match value, the ranking based on the respective confidence score.

10. The apparatus of claim 8, wherein one or more of the at least one processor circuit is to select the candidate product from the first dataset corresponding to the highest ranked candidate product of the ones of the first dataset of candidate products that received the match value.

11. At least one non-transitory computer-readable medium comprising computer-readable instructions to cause at least one processor circuit to at least:
  determine a geographic region associated with an input digital leaflet based on metadata obtained from the input digital leaflet;
  generate bounding boxes corresponding to a product promotion, the bounding boxes based on the geographic region;
  extract textual features from the bounding boxes corresponding to the product promotion by applying an optical character recognition (OCR) algorithm to the product promotion and linking output textual data with respective ones of the bounding boxes;
  identify a search attribute corresponding to a product represented in the product promotion, the search attribute based on the geographic region;
  evaluate the search attribute against a second dataset of products to generate a first dataset of candidate products corresponding to the product in the product promotion, the second dataset of products based on the geographic region; and
  select a candidate product from the first dataset of candidate products to associate with the product promotion, the candidate product selected based on a match assessment.

12. The at least one non-transitory computer-readable medium of claim 11, wherein identifying the bounding boxes of the input digital leaflet further includes categorizing the bounding boxes of the input digital leaflet, the computer-readable instructions to cause one or more of the at least one processor circuit to identify the bounding boxes of the input digital leaflet by applying a trained region-based convolution neural network (R-CNN)-based model to the product promotion.

13. The at least one non-transitory computer-readable medium of claim 11, where the computer-readable instructions cause one or more of the at least one processor circuit to determine a fact attribute corresponding to the product promotion and associate the fact attribute with the product promotion.

14. The at least one non-transitory computer-readable medium of claim 13, wherein the computer-readable instructions cause one or more of the at least one processor circuit to determine at least one of the search attribute or target attribute by applying a natural language processing (NLP) based model to the extracted textual features.

15. The at least one non-transitory computer-readable medium of claim 11, wherein the computer-readable instructions cause one or more of the at least one processor circuit to determine a match or a mismatch value for ones of the first dataset of candidate products, the match or mismatch value to include a calculated confidence score.

16. The at least one non-transitory computer-readable medium of claim 11, wherein the computer-readable instructions cause one or more of the at least one processor circuit to rank the ones of the first dataset of candidate products that received the match or mismatch value, the ranking based on the respective confidence scores.

17. The at least one non-transitory computer-readable medium of claim 11, wherein the computer-readable instructions cause one or more of the at least one processor circuit to select the candidate product from the first dataset corresponding to the highest ranked candidate product of the ones of the first dataset of candidate products that received the match or mismatch value.

18. A method comprising:
  determining, by executing an instruction with at least one processor circuit, a country associated with an input digital leaflet based on metadata extracted from the input digital leaflet;
  detecting, by executing an instruction with one or more of the at least one processor circuit, regions of the input digital leaflet corresponding to a product promotion, the regions based on the country;
  extracting, by executing instructions with one or more of the at least one processor circuit, textual features from the regions corresponding to the product promotion by applying an optical character recognition (OCR) algorithm to the product promotion and associating output text data with respective ones of the regions;
  determining, by executing an instruction with one or more of the at least one processor circuit, a search attribute corresponding to a product represented in the product promotion, the search attribute based on the country;
  generating, by executing an instruction with one or more of the at least one processor circuit, a first dataset of candidate products corresponding to the product in the product promotion by comparing the search attribute against a second dataset of products, the second dataset specific to the country; and
  selecting a candidate product from the first dataset of candidate products to associate with the product promotion, the candidate product selected based on a match determination.

19. The method of claim 18, wherein one or more of the at least one processor circuit is to determine a match or a mismatch value for ones of the first dataset of candidate products, the match or mismatch value including a confidence score.

20. The method of claim 19, wherein one or more of the at least one processor circuit is to rank the ones of the first dataset of candidate products that received the match or mismatch value, the ranking based on the respective confidence scores.

* * * * *